(12) United States Patent  
Haruta

(10) Patent No.: US 10,516,807 B2  
(45) Date of Patent: Dec. 24, 2019

(54) IMAGE FORMING APPARATUS AND IMAGE FORMING METHOD

(71) Applicant: CANON KABUSHIKI KAISHA, Tokyo (JP)

(72) Inventor: Kenichirou Haruta, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/884,860

(22) Filed: Jan. 31, 2018

(65) Prior Publication Data

US 2018/0234590 A1 Aug. 16, 2018

(30) Foreign Application Priority Data

Feb. 16, 2017 (JP) ................. 2017-027297

(51) Int. Cl.
*G06F 3/12* (2006.01)
*H04N 1/52* (2006.01)
*G03G 15/043* (2006.01)
*H04N 1/29* (2006.01)
*H04N 1/409* (2006.01)

(52) U.S. Cl.
CPC ............ *H04N 1/52* (2013.01); *G03G 15/043* (2013.01); *H04N 1/29* (2013.01); *H04N 1/4092* (2013.01); *H04N 2201/0082* (2013.01)

(58) Field of Classification Search
None
See application file for complete search history.

(56) References Cited

U.S. PATENT DOCUMENTS

2016/0266512 A1* 9/2016 Haruta ................. G03G 15/043

FOREIGN PATENT DOCUMENTS

JP 2016-167777 A 9/2016

* cited by examiner

*Primary Examiner* — Huo Long Chen
(74) *Attorney, Agent, or Firm* — Canon U.S.A., Inc. IP Division

(57) ABSTRACT

An apparatus which forms an electrostatic latent image by exposing a charged photosensitive member with light. The apparatus identifies a pixel which has density value less than a threshold value and is sandwiched in a predetermined direction between two pixels having density values greater than or equal to the threshold value in image data, generates screen image data by screen processing on the image data, and outputs, for each of one pixel of the two pixels sandwiching the identified pixel and a pixel adjacent to the one pixel in the predetermined direction, an adjusted density value the screen image data.

19 Claims, 26 Drawing Sheets

FIG.8

| p11 | p12 | p13 |
|-----|-----|-----|
| p21 | p22 | p23 |
| p31 | p32 | p33 |

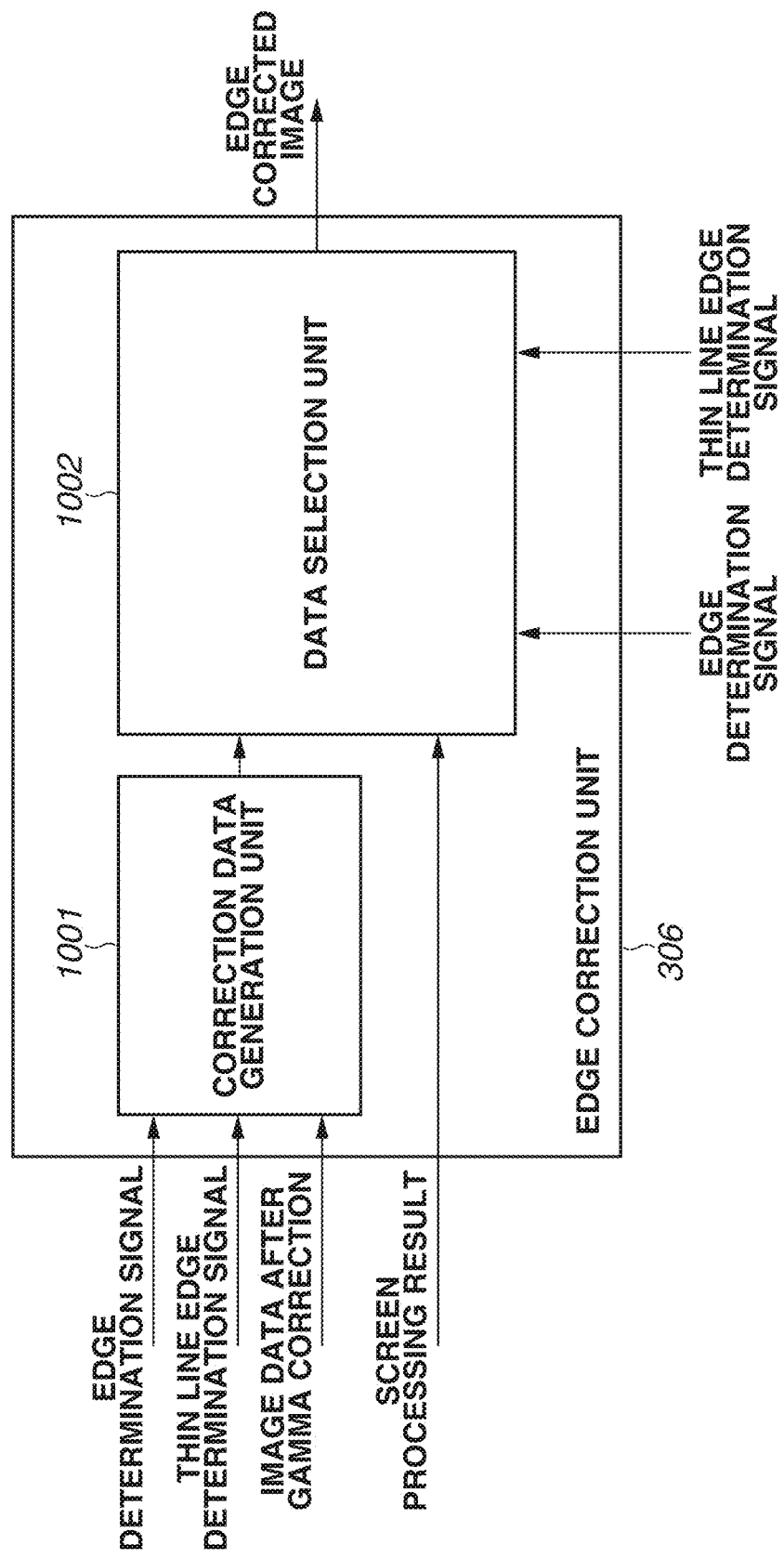

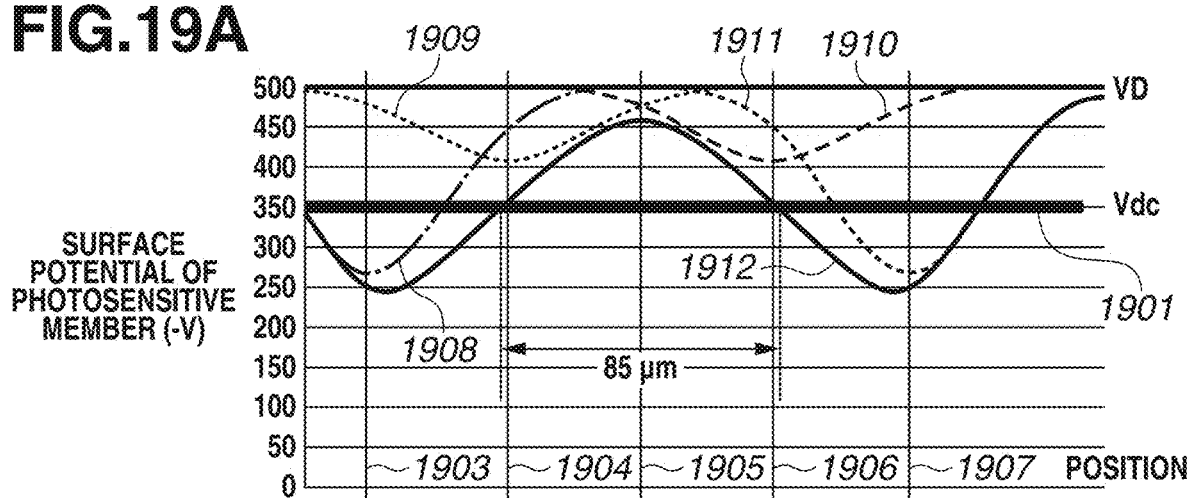
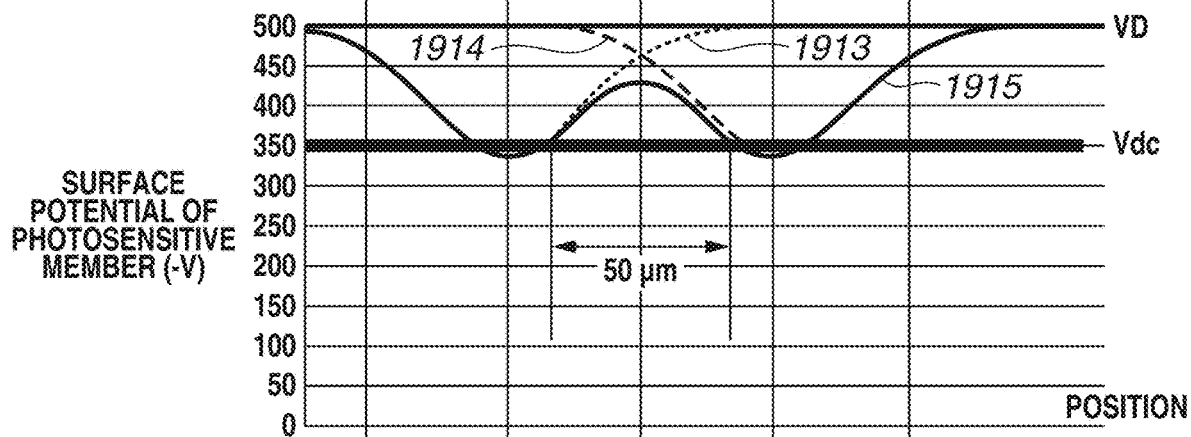
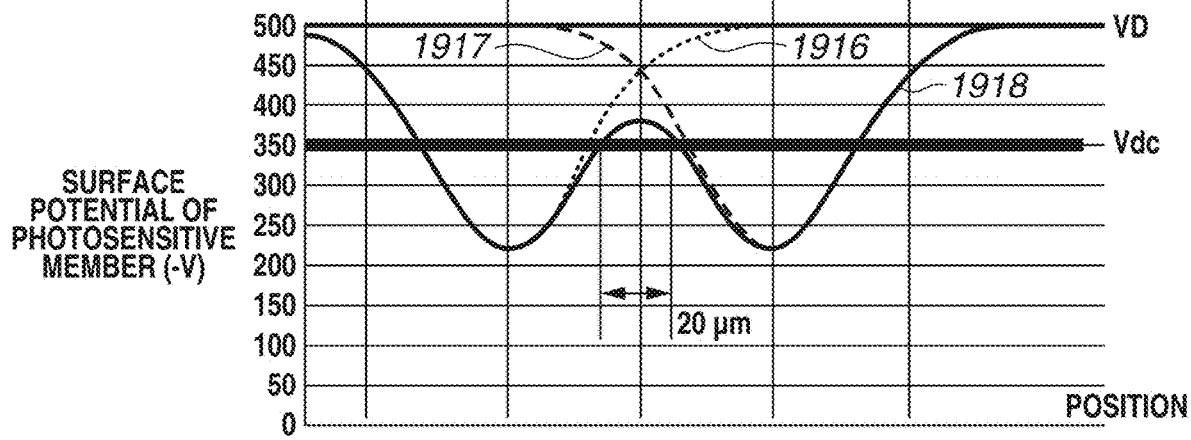

IMAGE FORMING APPARATUS AND IMAGE FORMING METHOD

BACKGROUND OF THE INVENTION

Field of the Invention

The aspect of the embodiment is a technique for correcting image data including a thin line.

Description of the Related Art

Image data pieces of print targets include small image objects (hereinbelow simply referred to as objects) such as thin lines and small point characters. Such small objects are sometimes difficult for users to visually recognize depending on characteristics of print engines in image forming apparatuses. Thus, there are techniques for correcting image data pieces of objects to make the objects easily visible for users. Japanese Patent Application Laid-Open No. 2016-167777 describes a technique for identifying a thin line included in image data and thickening a width of the identified white thin line by correcting density values of pixels adjacent to the identified white thin line.

In an electrophotographic method for exposing a photosensitive member with light based on a density value of each pixel in image data and forming an image by applying a developer (toner) on an exposed portion, exposure diameters of adjacent two pixels generally include a portion overlapping with each other in exposure. Thus, the density values of the respective adjacent two pixels influence a position and a magnitude of a peak of a potential finally formed on the photosensitive member. As a result, an adhesion position and an adhesion amount of the toner to the photosensitive member are varied according to the density values of the respective adjacent two pixels. Thus, it is difficult to finely adjust a position and a density of a contour portion of a white thin line by just correcting a density value of a pixel adjacent to the white thin line.

SUMMARY OF THE INVENTION

An apparatus including an image forming unit configured to form an electrostatic latent image by exposing a charged photosensitive member with light. The apparatus includes one or more memories, and one or more circuitries which use the one or more memories and perform as a identifying unit configured to identify a pixel which is less than a threshold value and is sandwiched in a predetermined direction between two pixels having density values greater than or equal to the threshold value in image data, a screen processing unit configured to generate screen image data by performing screen processing on the image data, and an output unit configured to receive the screen image data and output a density value of each pixel to the image forming unit, wherein the output unit outputs an adjusted density value of the screen image data for each of one pixel of the two pixels and a pixel adjacent to the one pixel in the predetermined direction based on the identifying.

Further features of the disclosure will become apparent from the following description of exemplary embodiments with reference to the attached drawings.

BRIEF DESCRIPTION OF THE DRAWINGS

FIG. 8 illustrates an example of a relationship between a target pixel and peripheral pixels in a three by three pixel window image.

FIG. 10 is a block diagram illustrating an edge correction unit according to the first exemplary embodiment.

FIGS. 19A to 19C illustrate potentials of a photosensitive member according to the first exemplary embodiment.

DESCRIPTION OF THE EMBODIMENTS

Various exemplary embodiments of the disclosure will be described in detail below. The individual exemplary embodiments described below will be helpful for understanding various concepts including a broader concept, a moderate concept, and a narrower concept of the disclosure. The technical scope of the disclosure is established by the scope of claims and not limited by the individual exemplary embodiments described below.

According to a first exemplary embodiment, an edge pixel and a thin line edge pixel in an image are identified, and jaggy reduction processing is performed by correcting density values of the edge pixel and pixels surrounding the thin line edge pixel. In particular, regarding the thin line edge pixel, the density values of the peripheral pixels are corrected with reference to a correction table corresponding to a distance from the thin line edge pixel so as to reduce a jaggy in the thin line and to change a width of the thin line. Accordingly, the jaggy in the edge portion is reduced while controlling the width of the thin line. A thin line according to the present exemplary embodiment includes portions of a horizontal line and a vertical line constituting a character.

Figure 1:
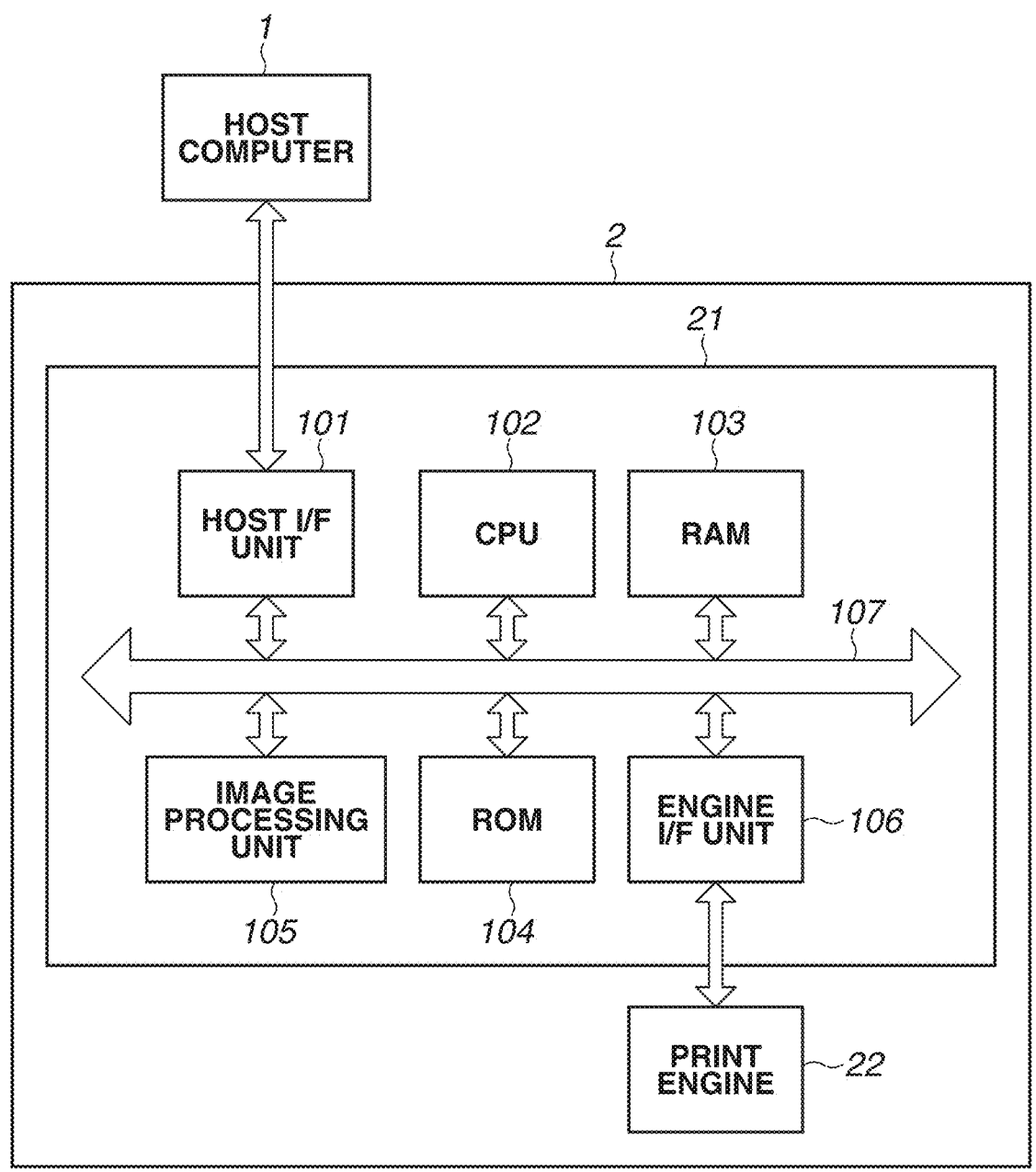
FIG. 1 is a schematic diagram illustrating a system configuration according to a first exemplary embodiment.

FIG. 1 is a schematic diagram illustrating a system configuration according to the present exemplary embodiment.

An image processing system illustrated in FIG. 1 is constituted of a host computer 1 and an image forming apparatus 2. The image forming apparatus 2 according to the present exemplary embodiment is an example of an image forming apparatus according to the present exemplary embodiment and includes a controller 21 and a print engine 22.

The host computer 1 is a general computer such as a personal computer (PC) and a work station (WS). An image and a document generated by a software application such as a printer driver, which is not illustrated, on the host computer 1 is transmitted as page description language (PDL) data to the image forming apparatus 2 via a network such as a local area network (LAN). In the image forming apparatus 2, the controller 21 receives the transmitted PDL data.

The controller 21 which is connected to the print engine 22 receives the PDL data from the host computer 1, converts the PDL data into print data which can be processed by the print engine 22, and outputs the print data to the print engine 22.

The print engine 22 prints an image based on the print data output from the controller 21. The print engine according to the present exemplary embodiment is an electrophotographic method type print engine which is described below.

Next, the controller 21 is described in detail. The controller 21 includes a host interface (I/F) unit 101, a central processing unit (CPU) 102, a random access memory (RAM) 103, a read-only memory (ROM) 104, an image processing unit 105, an engine I/F unit 106, and an internal bus 107.

The host I/F unit 101 is an interface for receiving the PDL data transmitted from the host computer 1. The host I/F unit 101 is constituted of, for example, Ethernet (registered trademark), a serial interface, or a parallel interface.

The CPU 102 entirely controls the image forming apparatus 2 using a program and data stored in the RAM 103 and the ROM 104 and also executes processing of the controller 21 described below.

The RAM 103 includes a work area used by the CPU 102 for executing various types of processing.

The ROM 104 stores a program and data for causing the CPU 102 to execute below-described various types of processing, setting data of the controller 21, and the like.

The image processing unit 105 may include one or more memories and one or more circuitries which use the one or more memories. Further, the image processing unit 105 may include one or more processors which execute one or more programs. The image processing unit 105 preforms image processing for printing on the PDL data received by the host I/F unit 101 in response to a setting from the CPU 102 and generates the print data which can be processed by the print engine 22. The image processing unit 105 performs especially rasterization on the received PDL data to generate image data including a plurality of color components per pixel. A plurality of color components is an independent color component in a color space such as a red-green-blue (RGB) color space. The image data has an 8-bit (256 gradation) value for one color component in each pixel. In other words, the image data is multi-valued bitmap data including a multi-valued pixel. In the above-described rasterization, attribute data indicating an attribute of the pixel in the image data is generated for each pixel in addition to the image data. The attribute data indicates which type of object the pixel belongs to and is a value indicating the type of object such as a character, a line, a figure, and an image. The image processing unit 105 generates the print data by performing image processing such as color conversion from the RGB color space to a cyan-magenta-yellow-black (CMYK) color space and halftone processing using the generated image data and attribute data. The image processing is described in detail below.

The engine I/F unit 106 is an interface for transmitting the print data generated by the image processing unit 105 to the print engine 22.

The internal bus 107 is a system bus connecting each of the above-described units.

Figure 2:
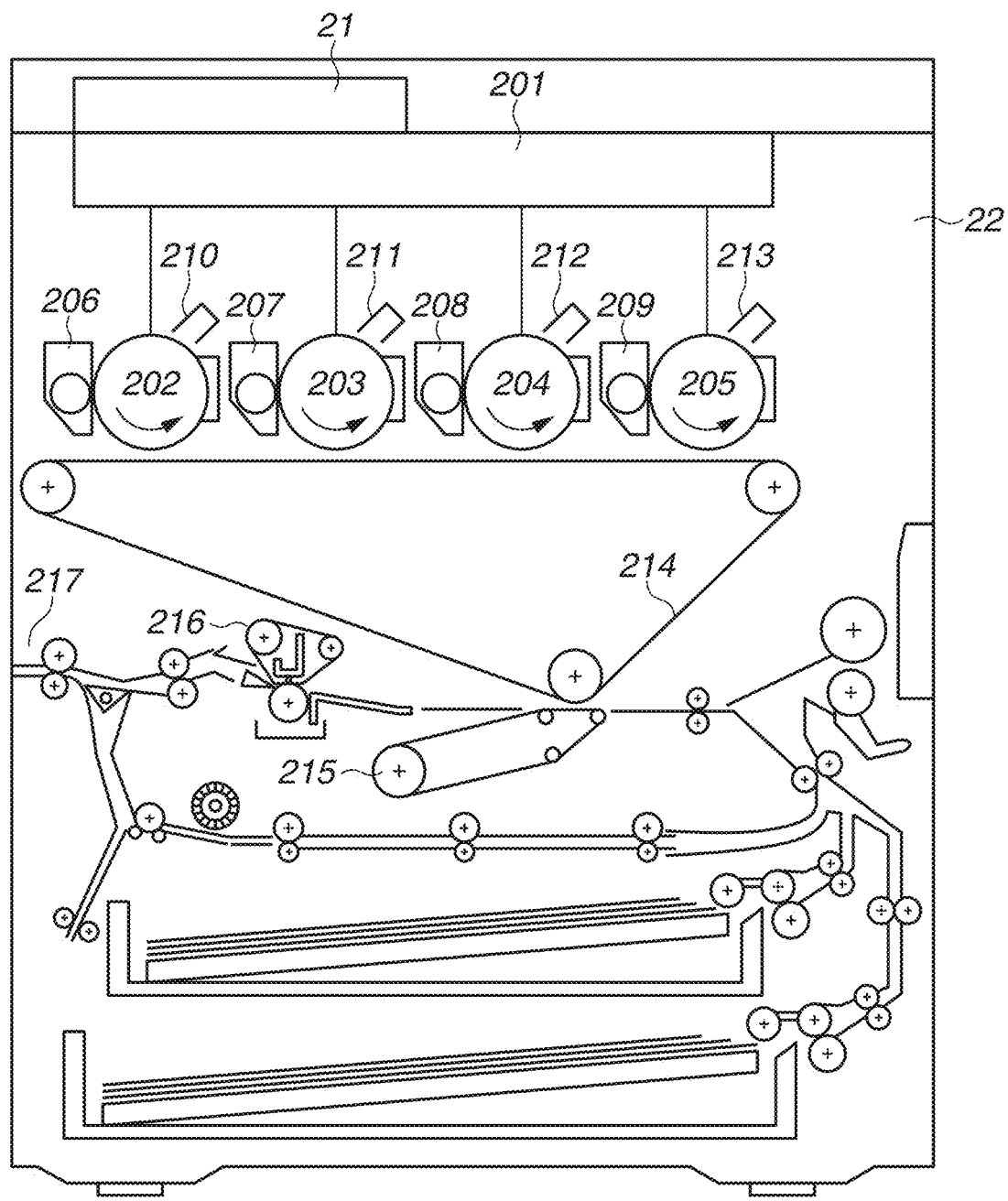
FIG. 2 is a cross-sectional view illustrating a schematic configuration of an image forming apparatus according to the first exemplary embodiment.

Next, the print engine 22 is described in detail with reference to FIG. 2. The print engine 22 adopts the electrophotographic method and has a configuration as illustrated in FIG. 2. More specifically, a charged photosensitive member (photosensitive drum) is irradiated with a laser beam of which an exposure intensity per unit area is modulated, thus a developer (toner) is adhered to an exposed portion, and a toner image (visible image) is formed. As a modulation method of an exposure intensity, there are conventional methods, such as a pulse width modulation (PWM). Important points here are as follows. (1) An exposure intensity of a laser beam with respect to one pixel is maximum at the center of the pixel and attenuates with the distance from the center of the pixel. (2) An exposure range (an exposure spot diameter) of the laser beam with respect to one pixel partly overlaps with an exposure range of an adjacent pixel, so that a final exposure intensity with respect to a certain pixel depends on cumulative exposure intensities with the adjacent pixel. (3) An adhesion condition of the toner varies according to the final exposure intensity. For example, when the final exposure intensity with respect to one pixel is strong in an entire range of the pixel, an image including dense and large pixels is visualized, and when the final exposure intensity with respect to one pixel is strong only in the center of the pixel, an image including dense and small pixels is visualized. According to the present exemplary embodiment, the image processing is performed by taking the above-described properties into consideration so as to be able to print dense and thick lines and characters. Next, a process to print an image from the print data is described.

Photosensitive drums 202, 203, 204, and 205 as image bearing members are rotatably supported by shafts at the respective centers and driven to rotate in arrow directions. The respective photosensitive drums 202 to 205 bear images formed by respective process color (for example, yellow, magenta, cyan, and black) toners. Primary electrostatic chargers 210, 211, 212, and 213, an exposure control unit 201, and development devices 206, 207, 208, and 209 are arranged to face outer circumferential surfaces of the photosensitive drums 202 to 205 in a rotation direction thereof. The primary electrostatic chargers 210 to 213 uniformly charge the surfaces of the photosensitive drums 202 to 205 to a negative potential (for example, −500 V). Subsequently, the exposure control unit 201 modulates the exposure intensity of the laser beams in response to the print data transmitted from the controller 21 and irradiates (exposes) the photosensitive drums 202 to 205 with the modulated laser beams. The potential of the exposed portion on the photosensitive drum surface is decreased to, for example, −100 V, and the portion of which the potential is decreased is formed as an electrostatic latent image on the photosensitive drum. The toners charged to the negative potentials and stored in the respective development devices 206 to 209 are applied to the formed electrostatic latent image by the development biases (for example, −300 V) of the development devices 206 to 209, and thus the toner images are formed. The toner images are transferred from the respective photosensitive drums 202 to 205 to an intermediate transfer belt 214 at positions at which the respective photosensitive drums 202 to 205 face the intermediate transfer belt 214. The transferred toner images are further transferred from the intermediate transfer belt 214 to a sheet such as paper conveyed to a position at which the intermediate transfer belt 214 faces a transfer belt 215. The sheet to which the toner images are transferred is subjected to fixing processing (heating and pressing) by a fixing unit 216 and discharged from a discharge port 217 to the outside of the image forming apparatus 2.

[Image Processing Unit]

Figure 3:
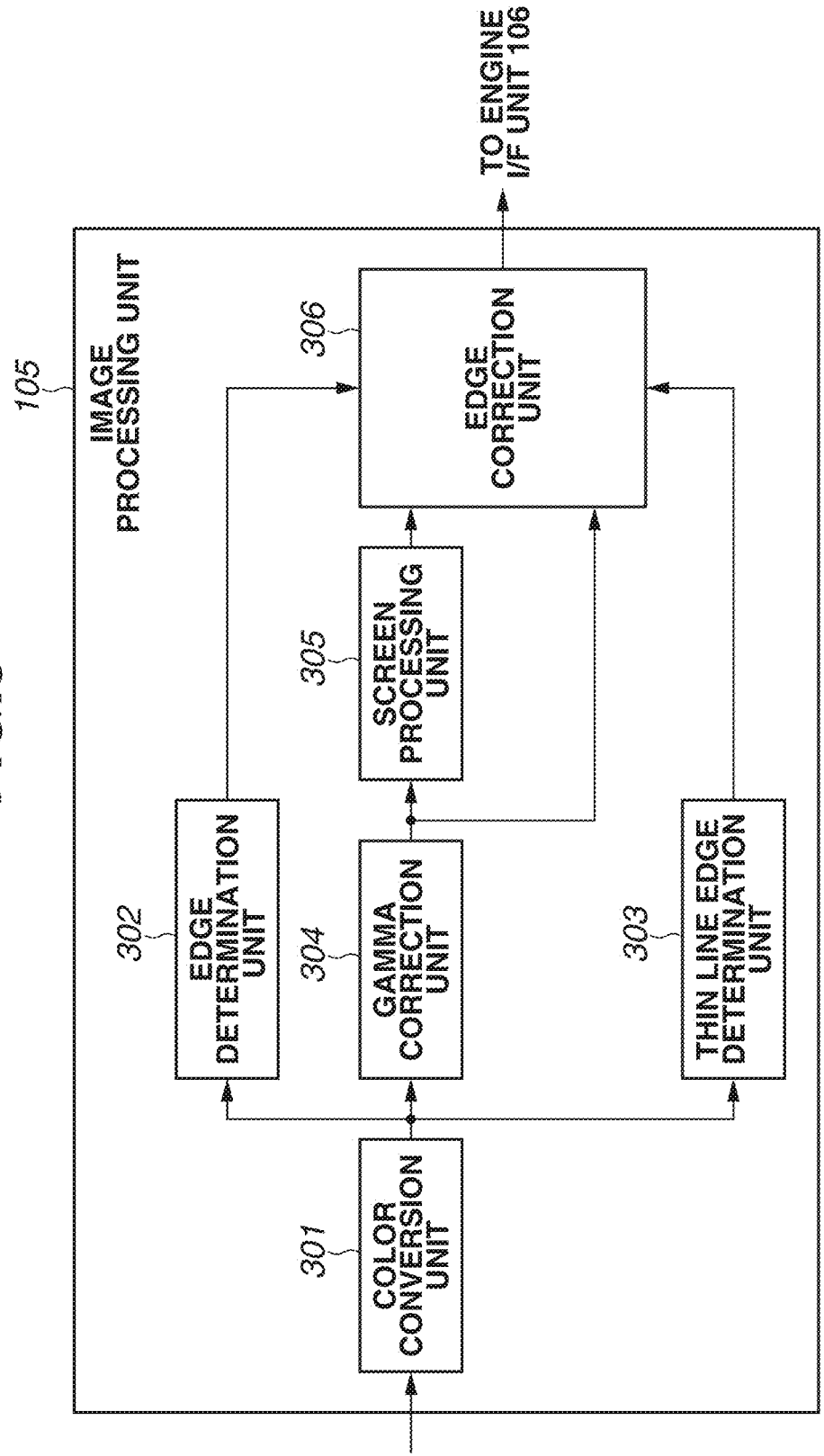
FIG. 3 is a block diagram illustrating an image processing unit according to the first exemplary embodiment.

Next, the image processing unit 105 is described in detail. The image processing unit 105 includes a color conversion unit 301, an edge determination unit 302, a thin line edge determination unit 303, a gamma correction unit 304, a screen processing unit 305, and an edge correction unit 306 as illustrated in FIG. 3. As described above, the image processing unit 105 performs rasterization processing on the PDL data received by the host I/F unit 101 and generates the multi-valued image data. The image processing for printing performed on the generated multi-valued image data is described in detail here.

The color conversion unit 301 performs color conversion processing from a gray scale color space or the RGB color space to the CMYK color space on the multi-valued image data. By the color conversion processing, the cyan, magenta, yellow, and black (CMYK) image data is generated which has a multi-valued density value (also referred to as a gradation value and a signal value) having an 8-bit (256 gradation) value for one color component in each pixel. The CMYK image data is stored in a buffer (a temporary memory), not illustrated, in the color conversion unit 301. For example, the image data for one page is stored in the buffer.

The edge determination unit 302 obtains pixel data (a target pixel and peripheral pixels) stored in the buffer of the color conversion unit 301, determines whether the target pixel is the edge pixel, and outputs a determination signal to the edge correction unit 306. The processing is performed for reducing a jaggy by performing edge correction processing on the edge pixel by the edge correction unit 306. Determination processing of the edge pixel (edge determination processing) performed by the edge determination unit 302 is described in detail below with reference to FIG. 5.

The thin line edge determination unit 303 obtains the pixel data (the target pixel and the peripheral pixels) stored in the buffer of the color conversion unit 301, determines whether the target pixel is the thin line edge pixel, and outputs a determination signal to the edge correction unit 306. The determination processing of the thin line edge pixel (thin line edge determination processing) performed by the thin line edge determination unit 303 is described in detail below with reference to FIG. 6 to FIGS. 9A to 9D.

The gamma correction unit 304 obtains the pixel data stored in the buffer of the color conversion unit 301 and performs gamma correction on the obtained pixel data. The gamma correction is performed in such a manner that the density value of the pixel data is corrected using a one-dimensional look-up table so as to make a density characteristic a desired characteristic when the image data subjected to screen processing by the screen processing unit 305 described below is transferred to a recording sheet. According to the present exemplary embodiment, a linear one-dimensional look-up table is used as an example. The look-up table is a look-up table which outputs an input as it is. However, the CPU 102 may rewrite the one-dimensional look-up table in response to a change in a state of the print engine 22. The pixel data after the gamma correction is input to the screen processing unit 305.

The screen processing unit 305 performs the screen processing on the pixel data input from the gamma correction unit 304 and outputs the processed pixel data to the edge correction unit 306.

The edge correction unit 306 performs the edge correction processing on the pixel data input from the gamma correction unit 304 according to the determination signals from the edge determination unit 302 and the thin line edge determination unit 303. Subsequently, the edge correction unit 306 outputs either of the pixel data after the edge correction processing or the pixel data input from the screen processing unit 305 to the engine I/F unit 106 as the print data.

[Screen Processing]

Next, the screen processing performed by the screen processing unit 305 according to the present exemplary embodiment is described in detail with reference to FIG. 4.

In the screen processing, the image data having 8 bits (256 gradations) per pixel is converted into image data having 4 bits (16 gradations) per pixel which can be processed by the print engine 22. In this conversion, a threshold matrix group including 15 pieces of threshold matrices is used for converting into 16 gradations image data.

In each threshold matrix, M*N pieces of the threshold values with a width M and a height N are arranged in a matrix form. The number of threshold matrices used in the screen processing is determined according a gradation of the image data to be output (in the case of L bits (L is an integer greater than or equal to two), the L-th power of two (2L) gradations), and the number of matrices is (2L−1). In the screen processing, the threshold value corresponding to each pixel in the image data is read from each surface of the threshold matrix, and a pixel value is compared with the threshold values of the number of surfaces.

In the case of the screen processing to 16 gradations, a first level to a 15-th level (Level 1 to Level 15) is set to each threshold matrix. Further, in the screen processing, the pixel value is compared with the corresponding threshold value in each threshold matrix, and a maximum value in the matrix level including the threshold value less than the pixel value is output. The output level value corresponds to a 4-bit gradation value after the screen processing. Accordingly, the density value of each pixel in the image data is converted into a 4-bit value. The threshold matrix is repeatedly applied in a period of M pixels in a horizontal direction and N pixels in a vertical direction of the image data in tiles.

Figure 4:
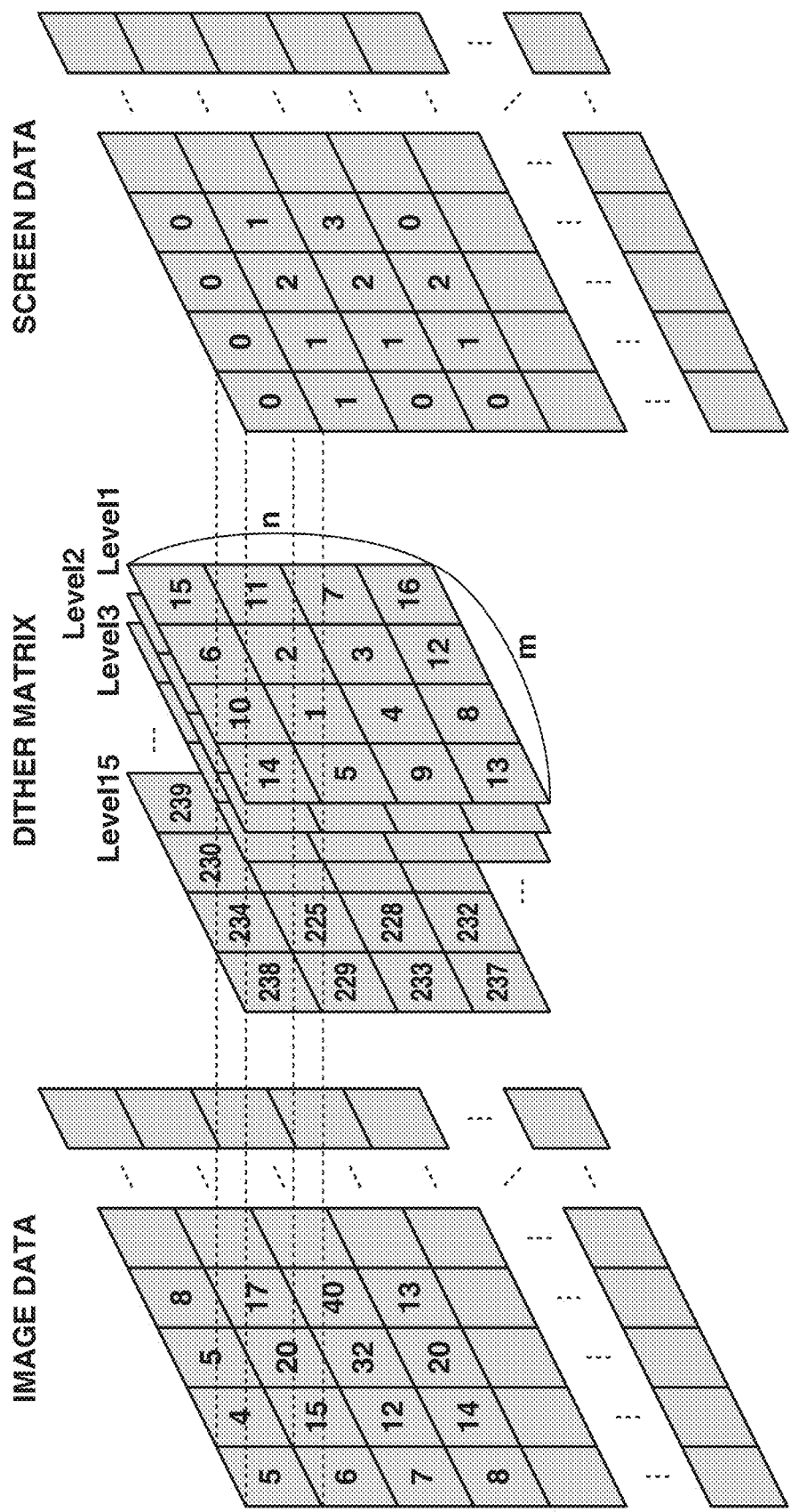
FIG. 4 illustrates screen processing.

The threshold matrix used in the screen processing unit 305 is a threshold matrix exemplified in FIG. 4.

[Edge Determination Processing]

Next, the edge determination processing by the edge determination unit 302 is described in detail with reference to FIG. 5. When a difference between a maximum value and a minimum value of signal values (density values) of a pixel in a reference area which has a predetermined size and includes the target pixel exceeds the threshold value, the edge determination unit 302 determines the target pixel as the edge pixel. In other words, the edge determination unit 302 functions as a unit for identifying at least an edge of an object such as a figure (including a colored background) and a line (including a thin line) in the image data. For example, when the colored background includes an outline character, a pixel of the background and a pixel of the outline character contacting with a boundary of the background and the outline character are determined as the edge pixels. A jaggy by the screen processing is generated at a boundary portion (i.e., the edge pixel) between objects, so that the determined edge pixel is corrected, and thus the jaggy can be reduced.

Figure 5:
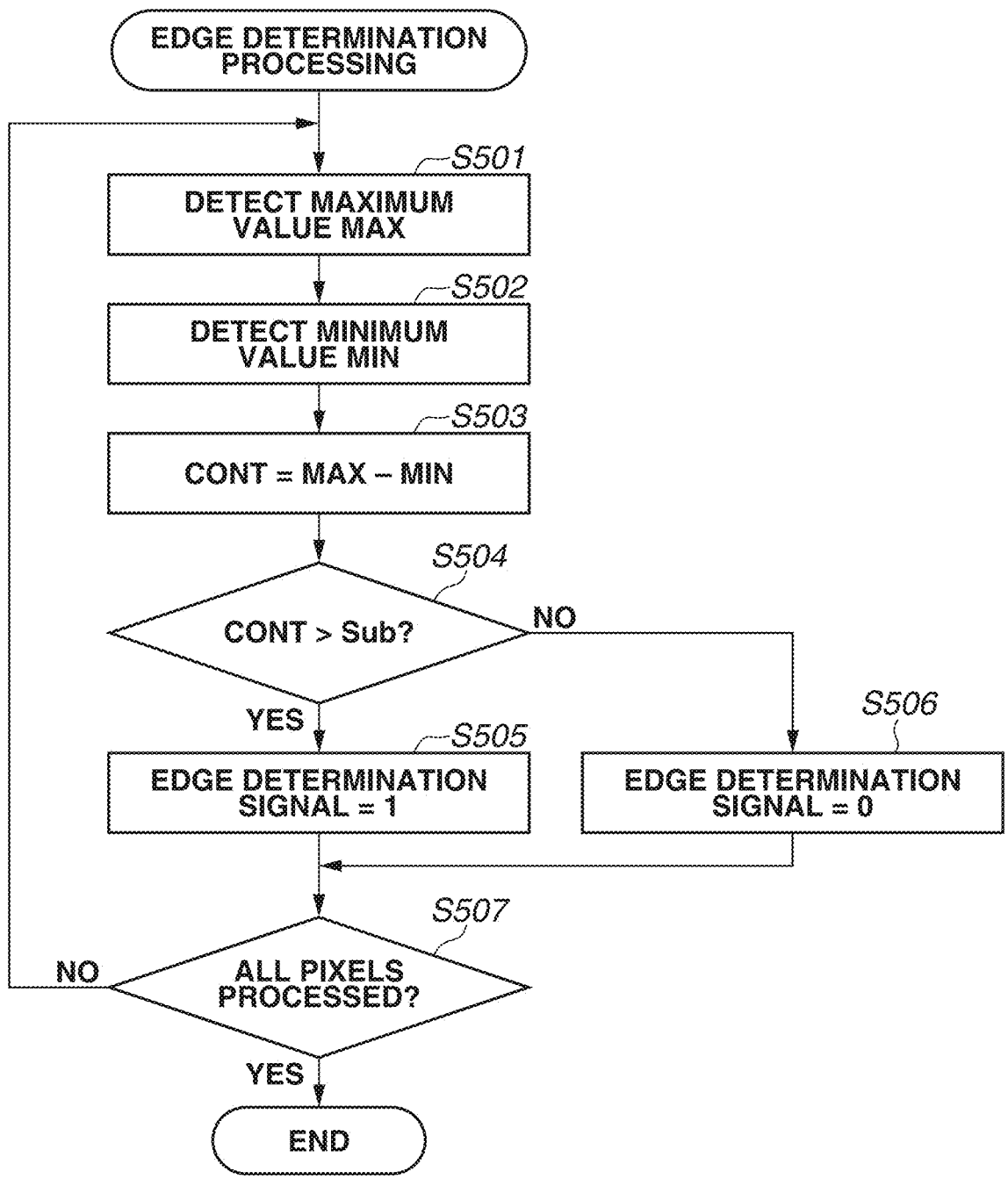
FIG. 5 is a flowchart illustrating processing of an edge determination unit according to the first exemplary embodiment.

FIG. 5 is a flowchart illustrating the edge determination processing performed by the edge determination unit 302. (Each step in the flowchart described below is executed by the edge determination unit 302 under an instruction from the CPU 102 illustrated in FIG. 1.)

In step S501, the edge determination unit 302 calculates a maximum pixel value (a maximum value [MAX]) in total nine pixels of a width of three pixels and a height of three pixels centered at the target pixel in the reference area with respect to the image data generated by the color conversion unit 301.

Next, in step S502, the edge determination unit 302 calculates a minimum pixel value (a minimum value [MIN]) in the total nine pixels of the width of three pixels and the height three pixels centered at the target pixel in the reference area with respect to the image data generated by the color conversion unit 301. The maximum value [MAX] and the minimum value [MIN] calculated in steps S501 and S502 are used to calculate a step between the signal values of the reference area.

In step S503, the edge determination unit 302 calculates a contrast value [CONT] by subtracting the minimum value [MIN] calculated in step S502 from the maximum value [MAX] calculated in step S501. The contrast value is calculated as a difference between the signal values of the reference area.

In step S504, the edge determination unit 302 compares a preliminarily determined edge determination value [Sub] with the contrast value [CONT] calculated in step S503 and determines whether the contrast value [CONT] is larger. As a result of determination, when the contrast value [CONT] is larger than the edge determination value [Sub] (YES in step S504), the processing proceeds to step S505. The preliminarily determined edge determination value [Sub] is a threshold value for determining an edge portion of an object and, for example, a threshold value for determining whether an edge portion of a character and a line.

On the other hand, when the contrast value [CONT] is less than or equal to the edge determination value [Sub] (NO in step S504), the processing proceeds to step S506.

In step S505, the edge determination unit 302 outputs "1" as an edge determination signal with respect to the target pixel.

In step S506, the edge determination unit 302 outputs "0" as an edge determination signal with respect to the target pixel.

In this regard, a pixel of which the edge determination signal is "1" is a pixel determined as the edge pixel, and a pixel of which the edge determination signal is "0" is a pixel determined as not the edge pixel.

In step S507, the edge determination unit 302 determines whether the processing is performed on all of the pixels included in the buffer of the color conversion unit 301. When the processing is not completed on all of the pixels (NO in step S507), the processing proceeds to step S501. When the processing is completed on all of the pixels (YES in step S507), the present processing is terminated.

The edge determination processing by the edge determination unit 302 according to the present exemplary embodiment is described to determine whether the edge portion or not by an absolute value of the difference between the maximum value and the minimum value in the three by three pixel area, however, the edge determination processing is not limited to the above-described one. For example, determination of whether the edge portion or not may be performed on each pixel in the image data by calculating first derivation with respect to a peripheral pixel.

[Thin Line Edge Determination Processing]

Next, thin line edge determination processing performed by the thin line edge determination unit 303 according to the present exemplary embodiment is described in detail with reference to FIG. 6 to FIGS. 9A to 9D.

Figure 6:
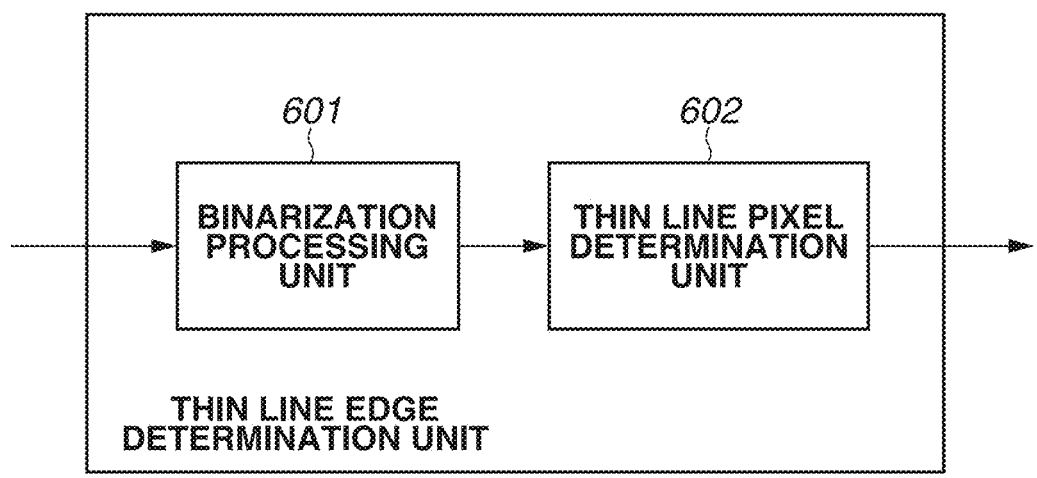
FIG. 6 is a block diagram illustrating a thin line edge determination unit according to the first exemplary embodiment.

FIG. 6 is a block diagram illustrating the thin line edge determination unit 303. The thin line edge determination unit 303 is constituted of a binarization processing unit 601 and a thin line pixel determination unit 602. The thin line edge determination unit 303 obtains a three by three pixel window image centered at the target pixel as a processing target in the CMYK image data stored in the buffer in the color conversion unit 301. The binarization processing unit 601 binarizes the obtained three by three pixel window image by a preliminarily determined threshold value. The binarization processing unit 601 converts a pixel whose density value is greater than or equal to the binarization threshold into a black pixel, and converts a pixel whose density value is less than the binarization threshold into a white pixel. The thin line pixel determination unit 602 determines whether the three by three pixel window image processed by the binarization processing unit 601 is a pixel constituting a part of the thin line. The thin line edge determination unit 303 outputs the determination result to the edge correction unit 306 as a thin line edge determination signal with respect to the target pixel. A pixel of which the thin line edge determination signal is "1" is a pixel determined as the thin line edge pixel, and a pixel of which the thin line edge determination signal is "0" is a pixel determined as not the thin line edge pixel. As described below, the thin line edge determination unit 303 according to the present exemplary embodiment identifies a thin line with one pixel width from the image data, however, may identify a thin line with a predetermined width (for example, a three pixel width) or less from the image data. In other words, the thin line edge determination unit 303 functions as a unit for identifying an area (a white area and a black area) having a predetermined width or less included in image data.

Figure 7:
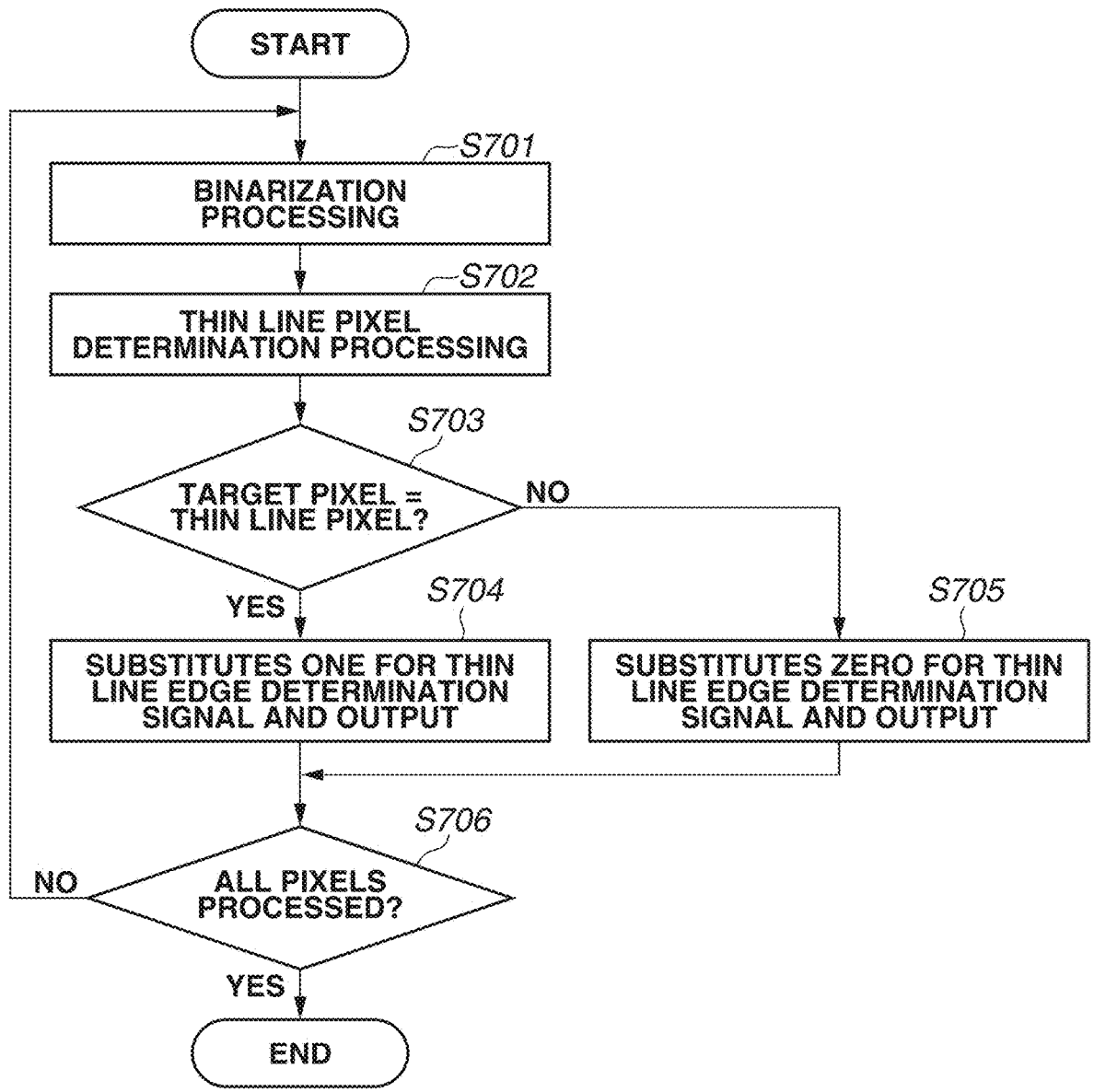
FIG. 7 is a flowchart illustrating processing of the thin line edge determination unit according to the first exemplary embodiment.
Figure 8:
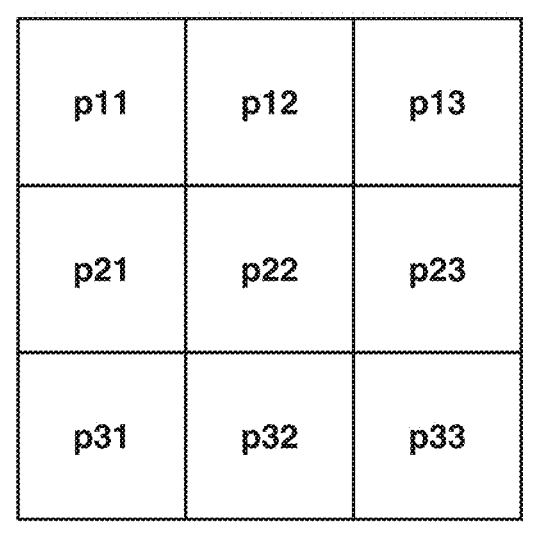

FIG. 7 is a flowchart illustrating the thin line edge determination processing performed by the thin line edge determination unit 303. Each step in the flowchart described below is executed by the binarization processing unit 601 and the thin line pixel determination unit 602 under an instruction from the CPU 102 illustrated in FIG. 1. FIG. 8 illustrates a three by three pixel window including a target pixel p22 and peripheral pixels to be input to the thin line edge determination unit 303. FIGS. 9A to 9D illustrate the thin line pixel determination processing performed by the thin line pixel determination unit 602.

According to the flowchart in FIG. 7, "1" is output as the thin line edge determination signal with respect to the target pixel in following four cases.

Figure 9A:
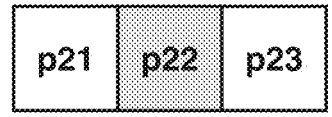
FIGS. 9A to 9D illustrate thin line pixel determination processing according to the first exemplary embodiment.

(1) The target pixel is a black pixel, and adjacent pixels on the right and left thereof are white pixels (see FIG. 9A).

Figure 9B:
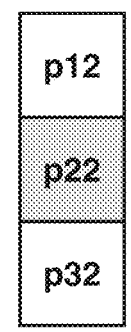

(2) The target pixel is a black pixel, and adjacent pixels above and below thereof are white pixels (see FIG. 9B). In short, in these cases (3) and (4), the pixel which has density value greater than or equal to the binarization threshold and is sandwiched in a predetermined direction (e.g. main scanning direction or sub scanning direction) between two pixels having density values less than the binarization threshold value in the CMYK image data is identified.

Figure 9C:
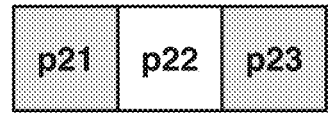

(3) The target pixel is a white pixel, and adjacent pixels on the right and left thereof are black pixels (see FIG. 9C).

Figure 9D:
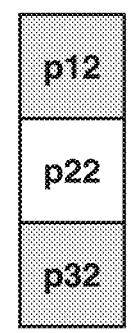

(4) The target pixel is a white pixel, and adjacent pixels above and below thereof are black pixels (see FIG. 9D). In short, in these cases (3) and (4), the pixel which has density value less than the binarization threshold and is sandwiched in a predetermined direction (e.g. main scanning direction or sub scanning direction) between two pixels having density values greater than or equal to the binarization threshold value in the CMYK image data is identified.

In a case other than the above-described four cases, "0" is output as the thin line edge determination signal with respect to the target pixel.

The above-described processing is performed to detect a thin line with one pixel width. Especially, the cases (1) and (2) are cases in which the target pixel is detected as a black thin line with one pixel width, and the cases (3) and (4) are cases in which the target pixel is detected as a white thin line with one pixel width. In this regard, a black pixel is a pixel having a pixel value of "1", and a white pixel is a pixel having a pixel value of "0".

The above-described processing can be modified to processing for detecting a thin line with two pixel width or less and processing for detecting a thin line with three pixel width or less. For example, when the processing is configured to identify a thin line with two pixel width, "1" may be output as the thin line edge determination signal with respect to the target pixel in a following case in addition to the above-described case (1). Namely, a case is that the target pixel and either of the right or left pixel thereof are black pixels, and, right and left adjacent pixels sandwiching these two black pixels are white pixels. In other words, each pixel constituting the thin line with two pixel width is identified as the thin line edge pixel. Similar extension can be applied to the cases (2) to (4). The processing can be similarly configured in the case when a thin line with three pixel width is identified, and in that case, two pixels on the both edges excepting the center pixel may be regarded as the thin line edge pixels in the three pixels constituting the width of the thin line. Each processing in the flowchart in FIG. 7 is described.

First, in step S701, the binarization processing unit 601 performs binarization processing on the three by three pixel window image as preprocessing for performing the determination processing by the thin line pixel determination unit 602. The binarization processing unit 601 performs simple binarization processing by, for example, comparing a predetermined threshold value and each pixel in the window. The binarization processing unit 601 outputs a value of 0 when the pixel density value is less than the threshold value and outputs a value of 1 when the pixel density value is greater than or equal to the threshold value with respect to the predetermined threshold value. The binarization processing according to the present exemplary embodiment is the simple binarization using the fixed threshold value, however, the binarization processing is not limited thereto. For example, the threshold value may be a difference between density values of the target pixel and the peripheral pixel.

Each pixel in the window image after the binarization processing is output to the thin line pixel determination unit 602.

Next, in step S702, the thin line pixel determination unit 602 analyzes the window image after the binarization processing to determine whether the target pixel is the thin line edge pixel.

Next, in step S703, when the target pixel p22 is determined as the thin line edge pixel (YES in step S703), in step S704, the thin line pixel determination unit 602 outputs a value of 1 as the thin line edge determination signal. When the target pixel p22 is not determined as the thin line pixel (NO in step S703), in step S705, the thin line pixel determination unit 602 outputs a value of 0 as the thin line edge determination signal.

In the above-described determination processing, the target pixel of which the adjacent pixels on both edges do not have the density values is determined as the thin line edge pixel, however, the determination processing may be performed by considering a line shape. For example, in order to discriminate a vertical line, it may be determined that whether only three pixels (p12, p22, p32) vertically aligned with the target pixel at the center have the value of 1 in the three by three pixels (p11, p12, p13, p21, p22, p23, p31, p32, p33). Further, in order to discriminate an oblique line, it may be determined that whether only three pixels (p11, p22, p33) obliquely aligned with the target pixel at the center have the value of 1 in the above-described three by three pixels.

Next, in step S706, the thin line edge determination unit 303 determines whether the processing is performed on all of the pixels included in the buffer of the color conversion unit 301, and when the processing is performed on all of the pixels (YES in step S706), the thin line edge determination processing is terminated. When it is determined that the processing is not performed on all of the pixels (NO in step S706), the target pixel is changed to an unprocessed pixel, and the processing proceeds to step S701.

[Edge Correction Processing]

Figure 13A:
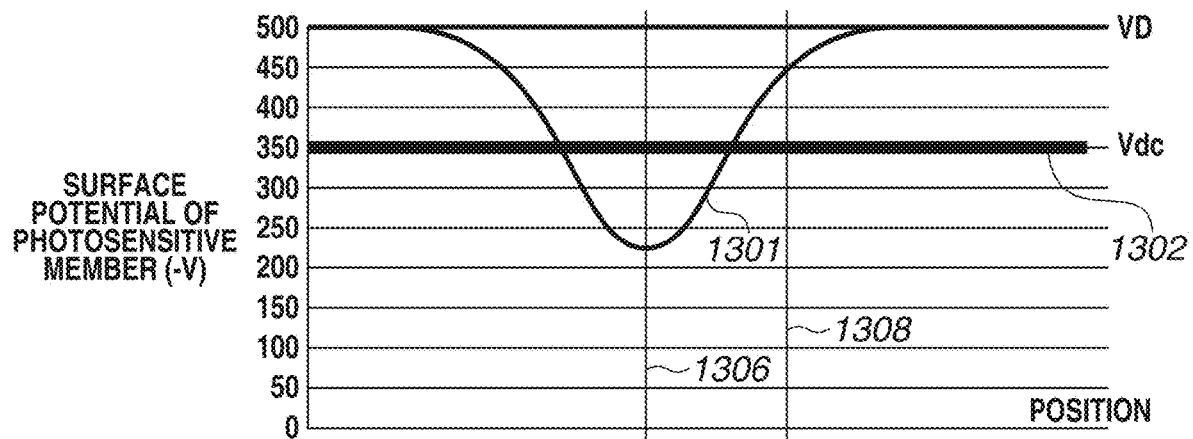
FIGS. 13A and 13B illustrate processing of the correction data generation unit according to the first exemplary embodiment.

As a method for improving a jaggy generated by the screen processing, there is a method for adding a pixel to the edge portion to fringe therewith. This method corresponds to processing described below in step S1105. A jaggy is improved by adding correction data to the edge pixel determined by the edge determination unit 302. The correction data is a corrected density value. Normally, the correction data is added to one pixel from the edge portion. In this regard, a thin line is to be controlled in a line width to prevent crush and wear, however, fringing with one pixel cannot shift a fringe position (a peak of exposure). Thus, according to the present exemplary embodiment, the correction data is added to two pixels from the thin line edge pixel to control the line width while reducing the jaggy. The processing is described in detail with reference to FIGS. 13A and 13B. FIG. 13A illustrates a situation of a potential on the photosensitive drum when the exposure control unit 201 exposes image data of one pixel with light. A potential 1301 is a potential distribution formed by the data of the one pixel centered at a position 1306. A potential 1302 is a development bias potential Vdc by the development device, and in a development process, the toner adheres to an area on the photosensitive drum of which a potential is lowered to less than or equal to the development bias potential Vdc, and an electrostatic latent image is developed.

Figure 13B:
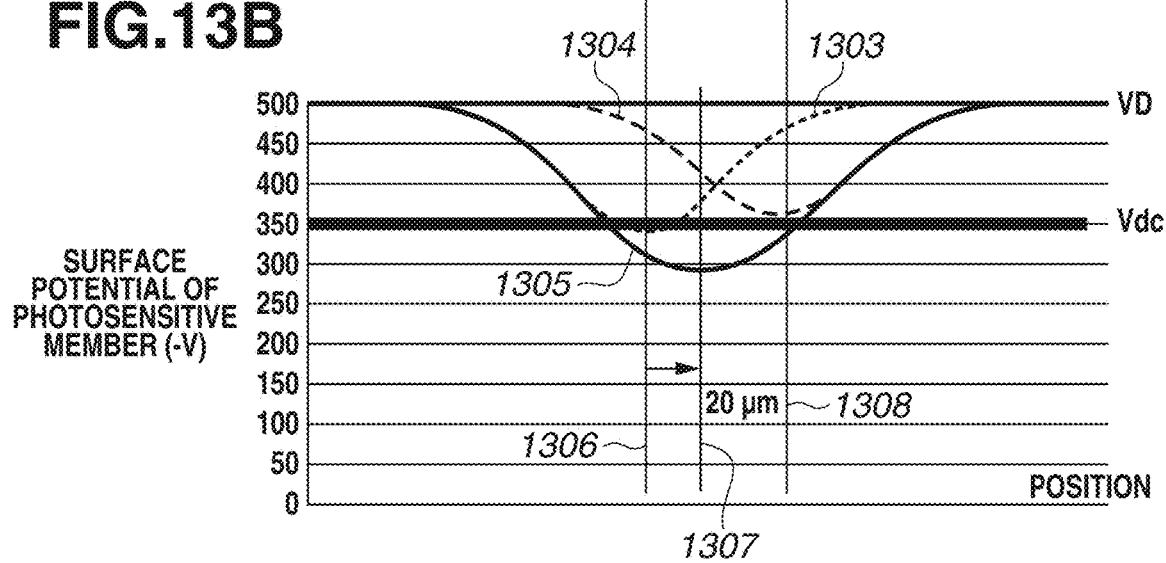

FIG. 13B illustrates a situation of a potential on the photosensitive drum when the exposure control unit 201 exposes image data of two pixels with light. The position 1306 and a position 1308 each indicate a center position of each pixel. A potential 1303 is formed by exposure based on the position 1306. A potential 1304 is formed by exposure based on the position 1308.

In addition, a potential 1305 formed by the exposure based on the image data of the two pixels at the positions 1306 and 1308 is obtained by superimposing (combining) the potentials 1303 and 1304. As can be seen from FIG. 13B, the exposure ranges (the exposure spot diameters) of the adjacent pixels are overlapped.

In the potential 1301 illustrated in FIG. 13A, a center of a portion greater than or equal to the development bias potential (Vdc) is the position 1306.

In the potential 1305 illustrated in FIG. 13B, a center of a portion greater than or equal to the development bias potential (Vdc) is a position 1307 which is 20 microns shifted from the position 1306. Further, the potential 1305 is the one obtained by superimposing (combining) the potentials 1303 and 1304, so that the center of the portion greater than or equal to the development bias potential (Vdc) in the potential 1305 can be freely controlled by adjusting the potentials 1303 and 1304. In other words, the center of the portion greater than or equal to the development bias potential (Vdc) cannot be controlled in the one pixel, however, the center of the portion greater than or equal to the development bias potential (Vdc) can be controlled in the two pixels. Further, a center position of the portion greater than or equal to the development bias potential (Vdc) is the line width of the thin line.

[Detail of Edge Correction Processing]

Next, image processing performed by the edge correction unit 306 according to the present exemplary embodiment is described in detail with reference to FIGS. 10 to 15.

FIG. 10 is a block diagram illustrating the edge correction unit 306. The edge correction unit 306 is constituted of a correction data generation unit 1001 and a data selection unit 1002. The correction data generation unit 1001 generates the correction data using the edge determination signal, the thin line edge determination signal, and the image data after the gamma correction (the image data before the screen processing) and outputs the generated correction data to the data selection unit 1002. The data selection unit 1002 inputs the correction data and the screen processing result thereto and selects data to output according to the edge determination signal and the thin line edge determination signal. More specifically, the data selection unit 1002 selects whether to output the density value after the screen processing or the corrected density value as the pixel density value. In other words, the edge correction unit 306 performs processing for correcting the pixel density value of the image data after the screen processing to the density value of the correction data.

Figure 11:
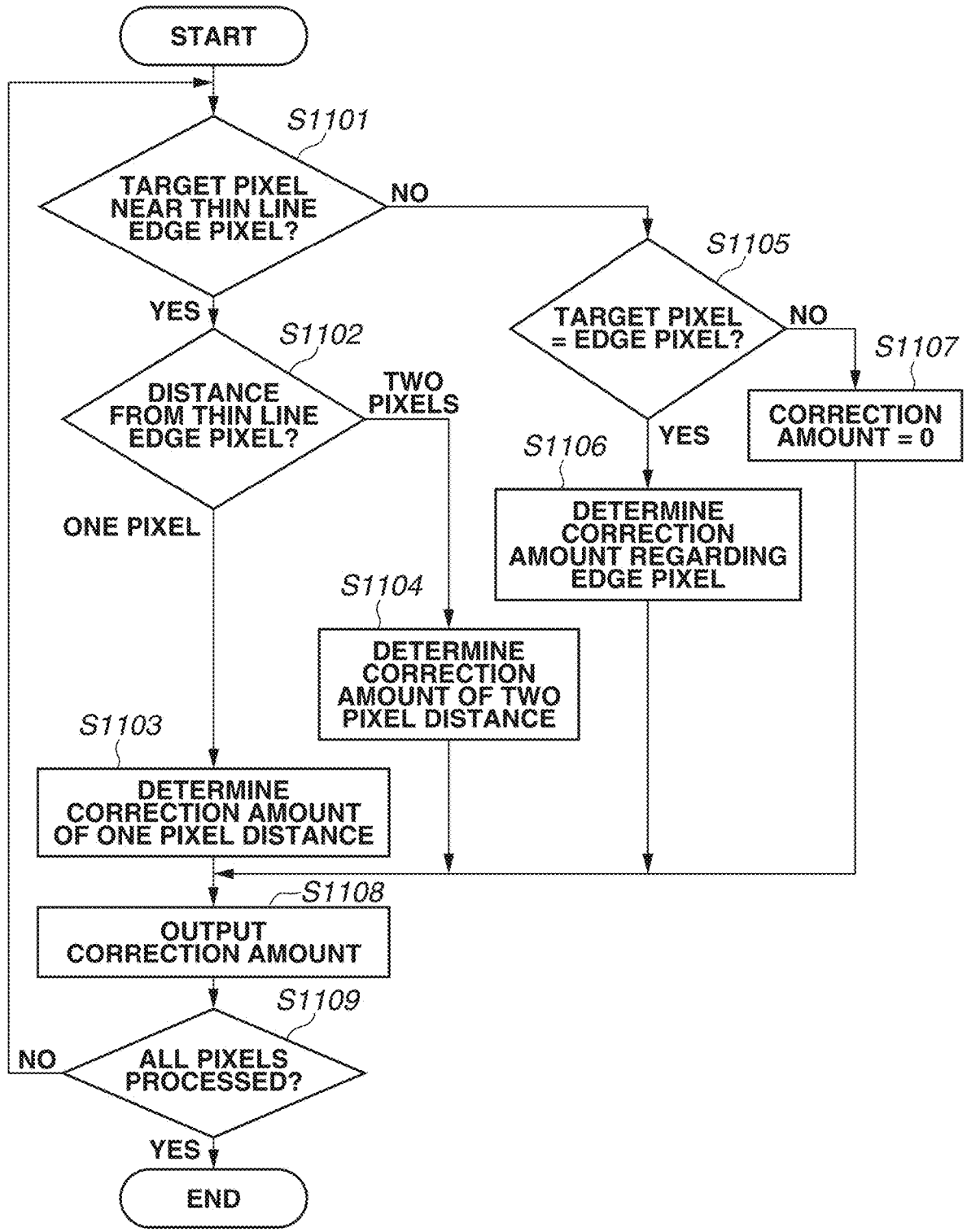
FIG. 11 is a flowchart illustrating processing of a correction data generation unit according to the first exemplary embodiment.

FIG. 11 is a flowchart illustrating correction data generation processing performed by the correction data generation unit 1001.

Figure 12:
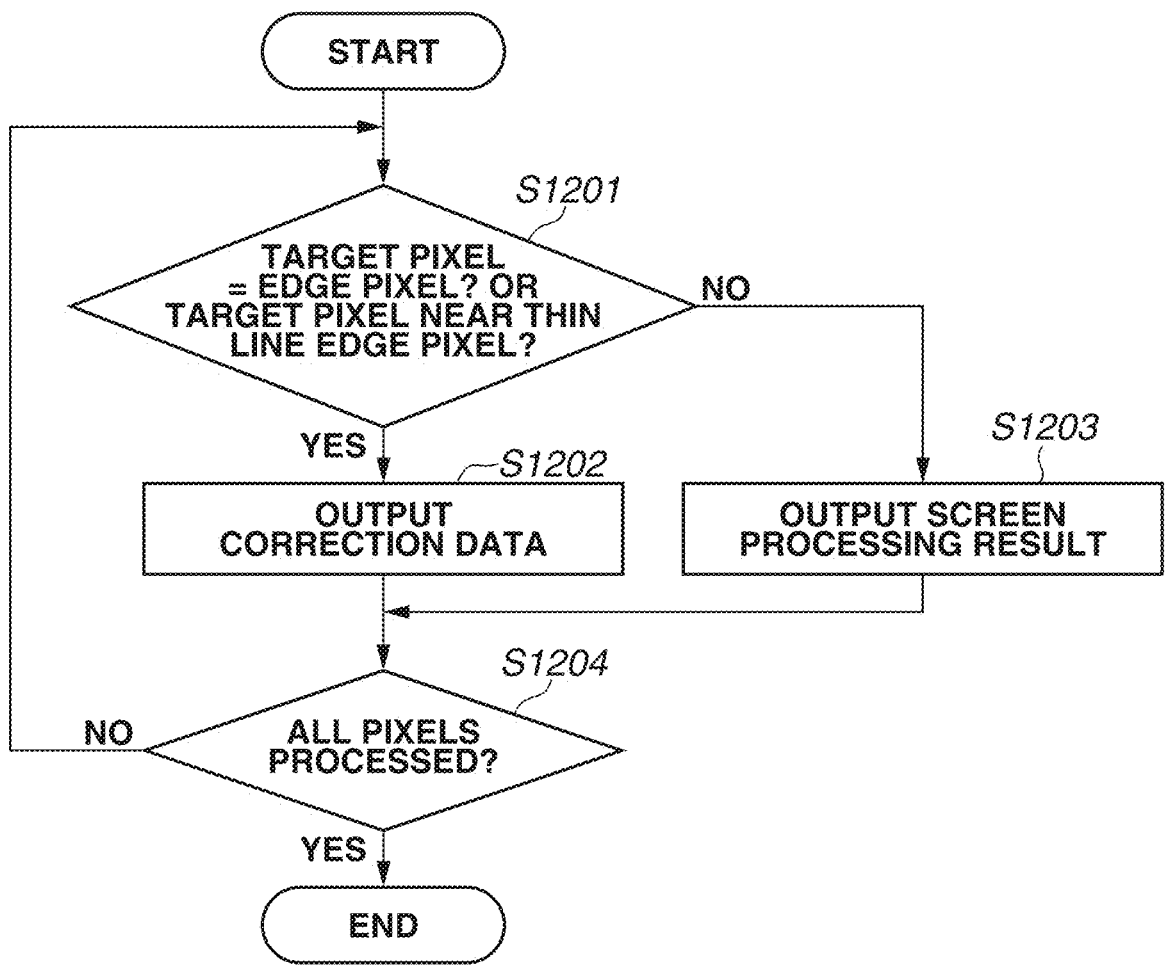
FIG. 12 is a flowchart illustrating processing of a data selection unit according to the first exemplary embodiment.

FIG. 12 is a flowchart illustrating data selection processing performed by the data selection unit 1002.

Figure 14A:
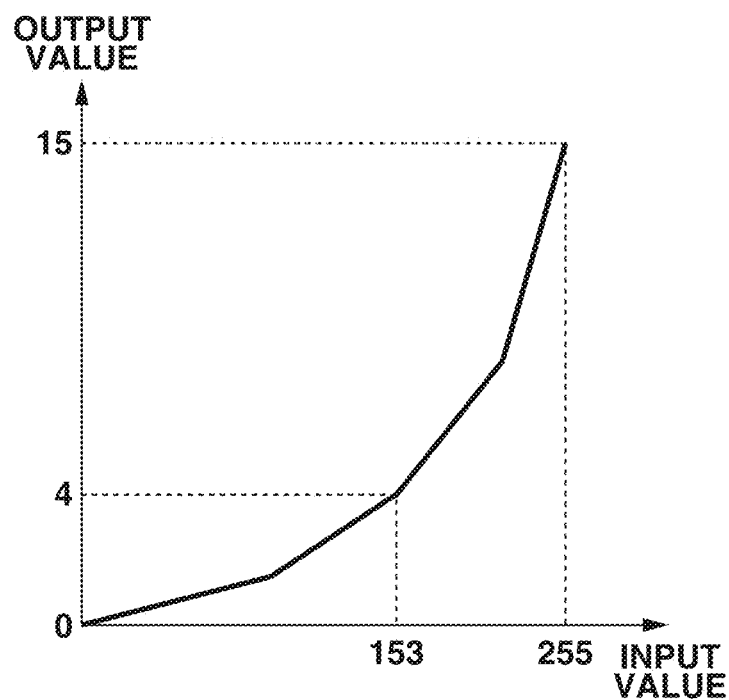
FIGS. 14A and 14B are examples of correction tables used by the correction data generation unit according to the first exemplary embodiment.

FIG. 14A is an example of a correction table for generating the correction data of a first pixel from the thin line edge pixel. The first pixel from the thin line edge pixel is a pixel which is adjacent to the thin line edge pixel in the predetermined direction (e.g. main scanning direction or sub scanning direction). The correction table includes correction amounts corresponding to the pixel values (density values) of the target pixel. The correction amount is also referred to as an adjusted density value or a corrected density value. An abscissa axis indicates an input of the look-up table, and the pixel value (density value) of the target pixel is input. An input image is an 8 bit image, and thus the abscissa axis can have values (density values) from 0 to 255. An ordinate axis is an output of the look-up table and indicates the correction amounts corresponding to the pixel values of the target pixel. The correction data is 4 bit image data which can be output from the print engine 22, and thus the ordinate axis can have values (density values) from 0 to 15.

Figure 14B:
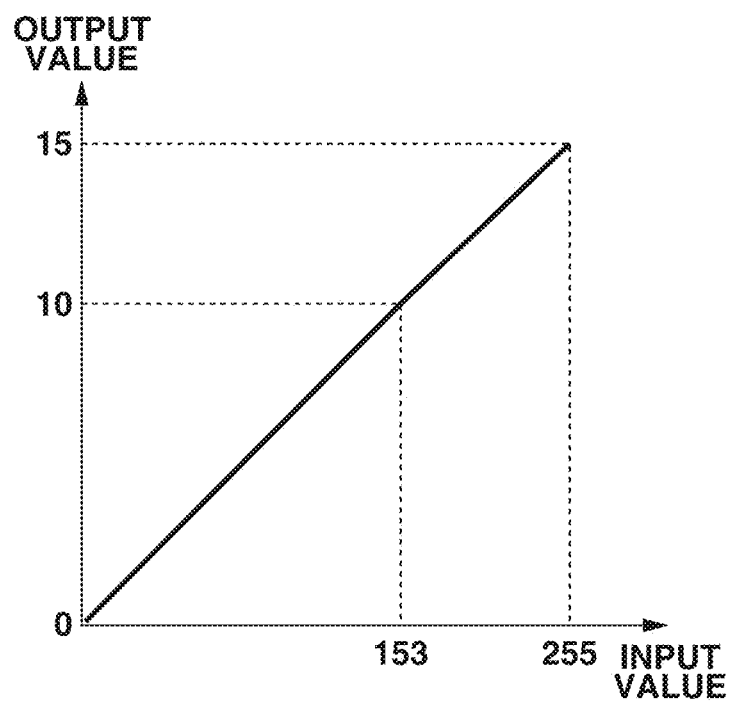

FIG. 14B is an example of a correction table for generating the correction data of a second pixel from the thin line edge pixel. The second pixel from the thin line edge pixel is a pixel which is adjacent to the first pixel in the predetermined direction and different from the thin line edge pixel.

As described above, according to the present exemplary embodiment, two pixels, namely the first and the second pixels from the thin line edge pixel are used to realize control of the line width and reduction of the jaggy. Thus, the correction tables in FIGS. 14A and 14B are set so that the thin line has an arbitrary line width.

To obtain a jaggy reduction effect, a peak of a potential (combined potential) combined by being exposed based on the two pixels in FIGS. 14A and 14B is set to be sufficiently higher than the development bias (Vdc). Further, the thin line can be adjusted to an arbitrary width by adjusting a ratio of FIGS. 14A and 14B. For example, in FIG. 14A for the first pixel from the thin line edge pixel, an output value (density value) of 4 is obtained with respect to an input value (density value) of 153. On the other hand, in FIG. 14B for the second pixel from the thin line edge pixel, an output value of 10 is obtained with respect to the input value of 153. The output value in FIG. 14B is greater than that in FIG. 14A, thus a position of the peak of the combined potential formed by the exposure based on these two pixels is closer to the second pixel from the thin line edge pixel in FIG. 14B than the first pixel from the thin line edge pixel in FIG. 14A. In contrast, when the output value in FIG. 14A is greater than that in FIG. 14B, the center of the potential exposed based on the two pixels is at a position closer to the first pixel. In other words, when the output value in FIG. 14B is greater than that in FIG. 14A, the peak comes to a position away from the thin line edge pixel, and thus the line width is set wider compared to when the output value in FIG. 14A is greater than that in FIG. 14B. Thus, an intermediate density value is added to each of a pixel one pixel away from the thin line edge pixel (a first pixel adjacent to the thin line edge pixel) and a pixel two pixels away from the thin line edge pixel (a second pixel facing the thin line edge pixel across the first pixel). The intermediate density value is an intermediate density value (for example, 10 and 4) between the maximum value of 15 and the minimum value of 0. Accordingly, the width of the thin line can be finely adjusted in less than one pixel while reducing a jaggy generated around the thin line.

Figure 15:
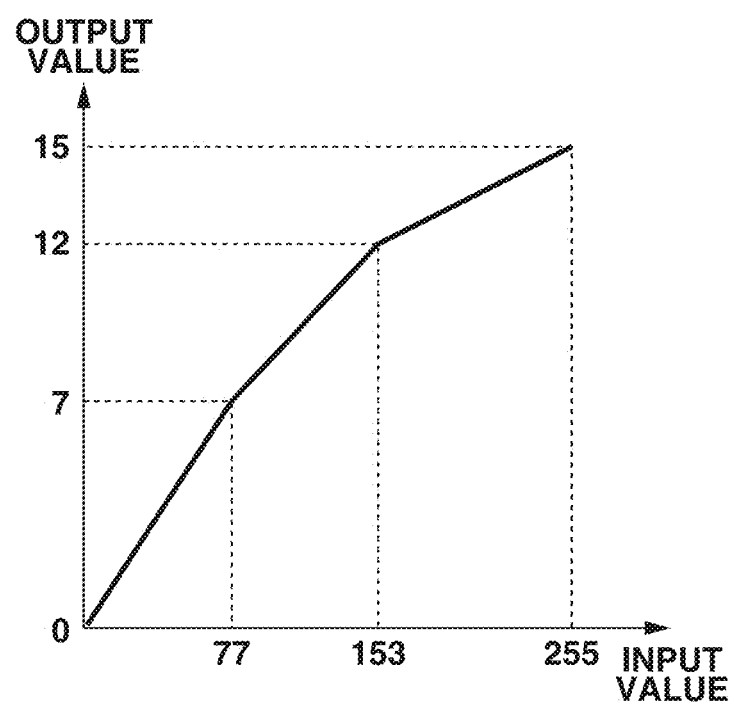
FIG. 15 is an example of a correction table used by the correction data generation unit according to the first exemplary embodiment.

FIG. 15 is an example of a correction table for generating the correction data for the edge pixel. The look-up table in FIG. 15 is used to set a most appropriate correction amount for reducing a jaggy generated by the screen processing at an edge portion of an object in each density area. The correction table for the edge pixel is designed to output the output value greater than those of the correction table for the first pixel from the thin line edge pixel and the correction table for the second pixel from the thin line edge pixel when the input value is the same value.

[Correction Data Generation Processing]

Each step in the flowchart described below is executed by the correction data generation unit 1001 under an instruction from the CPU 102 illustrated in FIG. 1.

The correction data generation unit 1001 generates the correction data from the edge determination signal, the thin line edge determination signal, and the image data after the gamma correction. The correction data generation processing performed by the correction data generation unit 1001 is described in detail.

In step S1101, the correction data generation unit 1001 determines whether the thin line edge pixel exists in neighboring two pixels of the target pixel by referring to the thin line edge determination signal input from the thin line edge determination unit 303. When it is determined that the thin line edge pixel exists in the neighboring two pixels of the target pixel (YES in step S1101), the processing proceeds to step S1102. When it is determined that the thin line edge pixel does not exist in the neighboring two pixels of the target pixel (NO in step S1101), the processing proceeds to step S1105. The processing is performed to identify the neighboring pixel for generating the correction data corresponding to a distance from the thin line edge pixel.

In step S1102, the correction data generation unit 1001 determines a distance of the thin line edge pixel from the target pixel. When the distance of the thin line edge pixel from the target pixel is one pixel (ONE PIXEL in step S1102), the processing proceeds to step S1103. When the distance of the thin line edge pixel from the target pixel is two pixels (TWO PIXELS in step S1102), the processing proceeds to step S1104. The processing is performed to generate the correction data corresponding to the distance from the thin line edge pixel.

In step S1103, the correction data generation unit 1001 determines the correction data by referring to the look-up table for the first pixel from the thin line edge pixel in FIG. 14A and using the image data after the gamma correction of the target pixel as an input.

In step S1104, the correction data generation unit 1001 determines the correction data by referring to the look-up table for the second pixel from the thin line edge pixel in FIG. 14B and based on the image data after the gamma correction of the target pixel.

The above-described processing in steps S1101 to S1104 corresponds to processing for correcting, based on that an object area having a predetermined width or less is identified, density values of the first pixel adjacent to the area and the second pixel facing the area across the first pixel. Regarding the first and the second pixels surrounding the thin line edge pixel, the pixel data after the present correction is selected by the data selection unit 1002 as described below.

In step S1105, the correction data generation unit 1001 determines whether the target pixel is the edge pixel. The processing is performed to generate the correction data of the edge pixel. When the target pixel is the edge pixel (YES in step S1105), the processing proceeds to step S1106, and when the target pixel is not the edge pixel (NO in step S1105), the processing proceeds to step S1107.

In step S1106, the correction data generation unit 1001 determines the correction amount according to the density of the edge pixel and performs correction processing by referring to the look-up table for determining the correction amount of the edge pixel in FIG. 15.

The above-described processing in steps S1105 and S1106 corresponds to processing for correcting, based on that an edge of an object is identified, a density value of a pixel which is a pixel of the edge and different from the first pixel adjacent to the above-described object area having the predetermined width or less. As illustrated in FIGS. 14A, 14B and 15, the density value of the edge pixel is corrected to a density value greater than the corrected density values of the above-described first and the second pixels. To the edge pixel which is not the first pixel, the pixel data after the present correction is selected by the data selection unit 1002 as described below.

In step S1107, the correction data generation unit 1001 determines that the target pixel is neither the edge pixel nor the neighboring pixel of the thin line edge and sets the correction amount to zero. To this pixel, the pixel data after the screen processing is selected by the data selection unit 1002 as described below.

In step S1108, the correction data generation unit 1001 outputs the determined correction amount to the data selection unit 1002.

In step S1109, the correction data generation unit 1001 determines whether the processing is performed on all of the pixels included in the buffer of the color conversion unit 301, and when it is determined that the processing is not performed on all of the pixels (NO in step S1109), the processing proceeds to step S1101. When the correction data generation unit 1001 determines that the processing is performed on all of the pixels (YES in step S1109), the edge correction processing is terminated.

[Data Selection Processing]

Each step in the flowchart described below is executed by the data selection unit 1002 under an instruction from the CPU 102 illustrated in FIG. 1.

Next, the data selection processing performed by the data selection unit 1002 is described in detail. The data selection unit 1002 outputs the correction data input from the correction data generation unit 1001 for the edge pixel and the neighboring pixel of the thin line edge pixel. Further, the data selection unit 1002 outputs the screen processing result for a pixel other than those and thus reduces the jaggy.

In step S1201, the data selection unit 1002 refers to the edge determination signal and the thin line edge determination signal and determines that the target pixel is the edge pixel or the thin line edge pixel when the relevant determination signal is "1". When the data selection unit 1002 determines that the target pixel is the edge pixel (YES in step S1201), the processing proceeds to step S1202 to perform correction on the edge pixel. When the data selection unit 1002 determines that the target pixel is not the edge pixel (NO in step S1201), the processing proceeds to step S1203. In addition, when the target pixel is in the neighborhood of the thin line edge pixel (the first pixel from the thin line edge pixel or the second pixel from the thin line edge pixel according to the present exemplary embodiment) (YES in Step S1201), the processing proceeds to step S1202 to perform correction on the thin line edge pixel. When the target pixel is not in the neighborhood of the thin line edge pixel (NO in step S1201), the processing proceeds to step S1203.

In step S1202, the data selection unit 1002 outputs the correction data to reduce the jaggies in the edge pixel and the thin line and to control the line width of the thin line. In other words, for the edge pixel, the first pixel from the thin line edge pixel, and the second pixel from the thin line edge pixel, adjusted density values are output, instead of density values of the screen processing result.

In step S1203, the data selection unit 1002 outputs the screen processing result.

In step S1204, the data selection unit 1002 determines whether the processing is performed on all of the pixels included in the buffer of the color conversion unit 301, and when it is determined that the processing is not performed on all of the pixels (NO in step S1204), the processing proceeds to step S1201. When the data selection unit 1002 determines that the processing is performed on all of the pixels (YES in step S1204), the edge correction processing is terminated.

[Situation of Image Processing in Edge Correction Processing]

Next, the edge correction processing is described in detail using a case as an example in which, in an image constituted of a white thin line and an image edge, jaggies of the white thin line and the image edge are reduced while controlling a line width of the white thin line with reference to FIGS. 16A to 16F to FIGS. 18A to 18F. The white thin line described according to the present exemplary embodiment corresponds to an area constituting a white object, such as an outline character, and having a predetermined width or less.

FIGS. 16A to 16F illustrate the image processing in detail which is performed by the edge correction unit 306 according to the present exemplary embodiment in detail.

FIGS. 17A to 17F illustrate the image processing in detail which is performed by the edge correction unit 306 when not the correction data but the thin line of an input multi-valued image is thickened for 0.5 pixel each on both sides.

FIGS. 18A to 18F illustrate the image processing in detail which is performed by the edge correction unit 306 when the line width of the white thin line is not controlled.

Figure 16A:
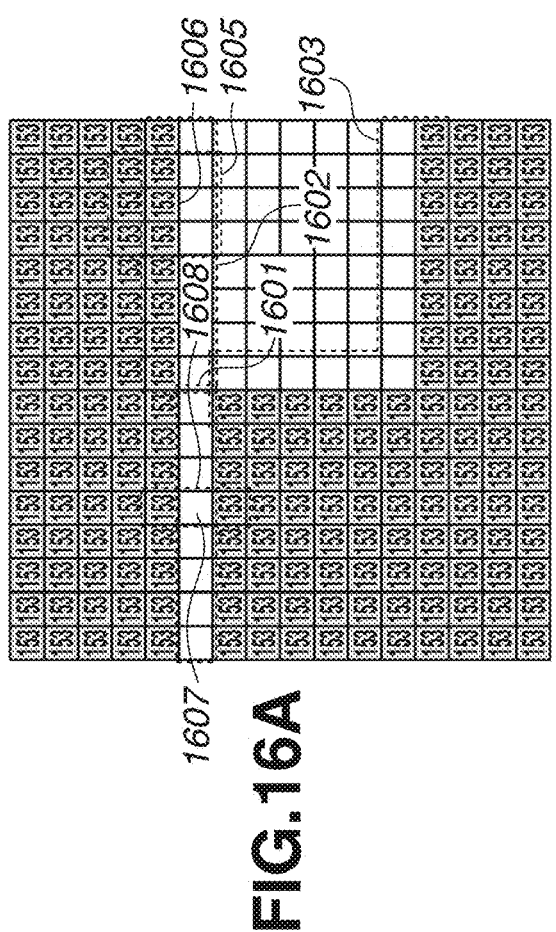
FIGS. 16A to 16F illustrate processing of the edge correction unit according to the first exemplary embodiment.

FIG. 16A illustrates an image which is output from the gamma correction unit 304 according to the present exemplary embodiment and input to the edge correction unit 306. Numerical values in the drawing are density values of pixels, and pixels without numerical values have density values of zero. The image in FIG. 16A is constituted of a white thin line 1601 of one pixel, an image edge 1602, and an image edge 1603.

Figure 16B:
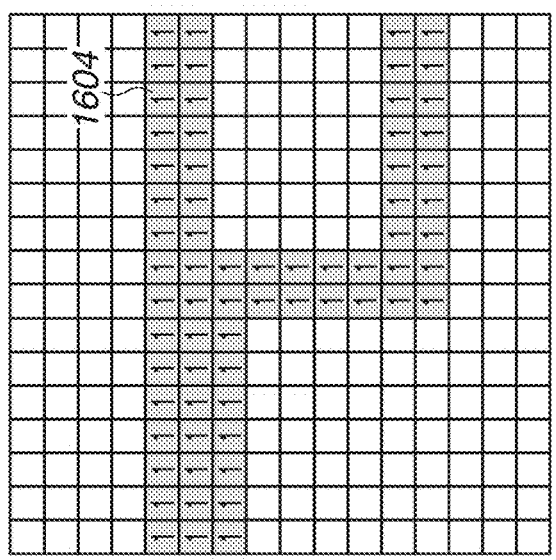

FIG. 16B illustrates an image of an edge determination result when edge pixels are determined according to the edge determination processing in FIG. 5. In a pixel group 1605 of three by three pixels centered at a pixel 1606, the maximum value [MAX] is 153. Further, the minimum value [MIN] of the pixel group 1605 of three by three pixels is 0. Accordingly, the contrast value [CONT] is 153.

When then edge determination value [Sub] is 64, the contrast value [CONT] is greater than the edge determination value [Sub]. Accordingly, the edge determination signal is "1", and a pixel 1604 is "1".

Figure 16C:
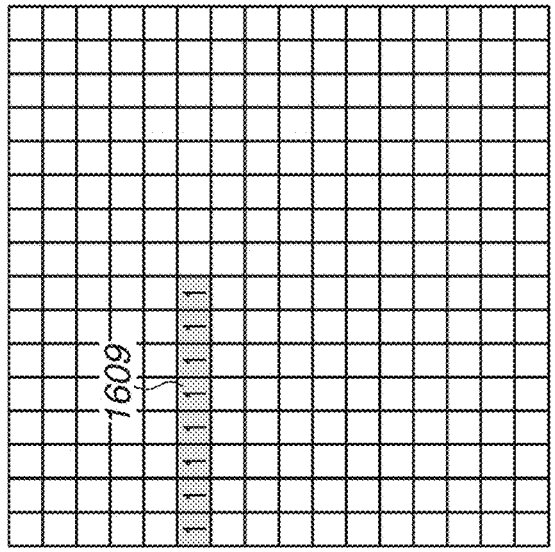

FIG. 16C illustrates an image of a thin line edge determination result when the thin line edge pixels are determined according to the thin line edge determination processing in FIG. 7. In a pixel group 1608 of one by three pixels centered at a pixel 1607, when a binarization threshold value is 64, the target pixel 1607 is "0". Further, pixels other than the target pixel are "1". In addition, the pixel 1607 is determined as matching with the pattern in FIG. 9D by pattern matching, so that the thin line edge determination signal of the pixel 1607 is "1".

Figure 16D:
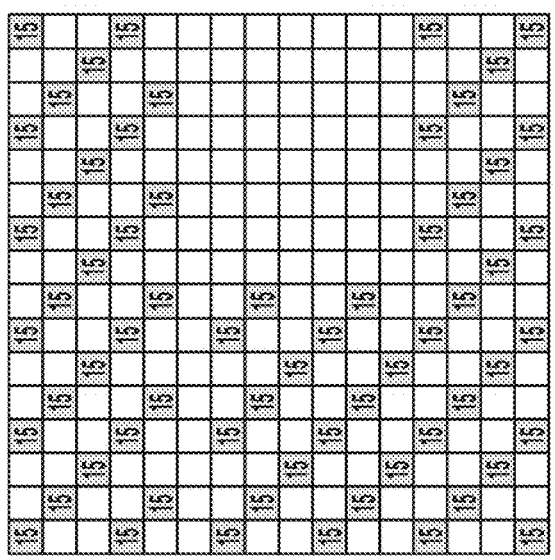

FIG. 16D illustrates an image of a screen processing result input from the screen processing unit 305 according to the present exemplary embodiment. The screen processing result is obtained by comparing each pixel value in FIG. 16A with the corresponding threshold value.

Figure 16F:
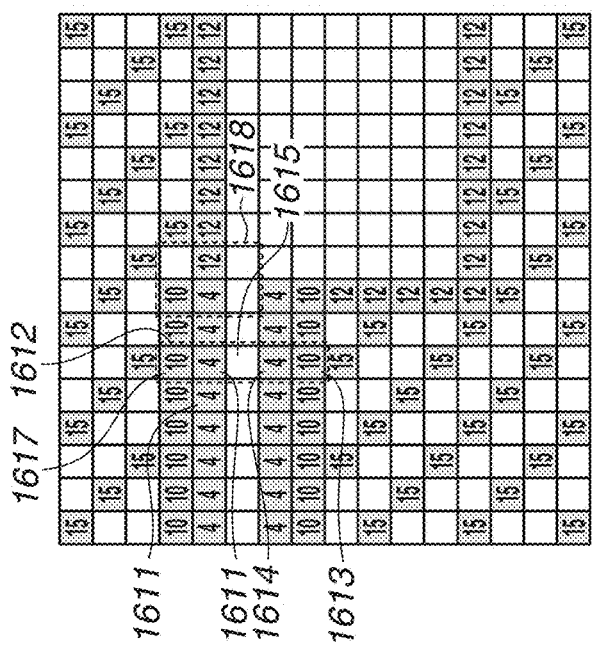
Figure 16E:
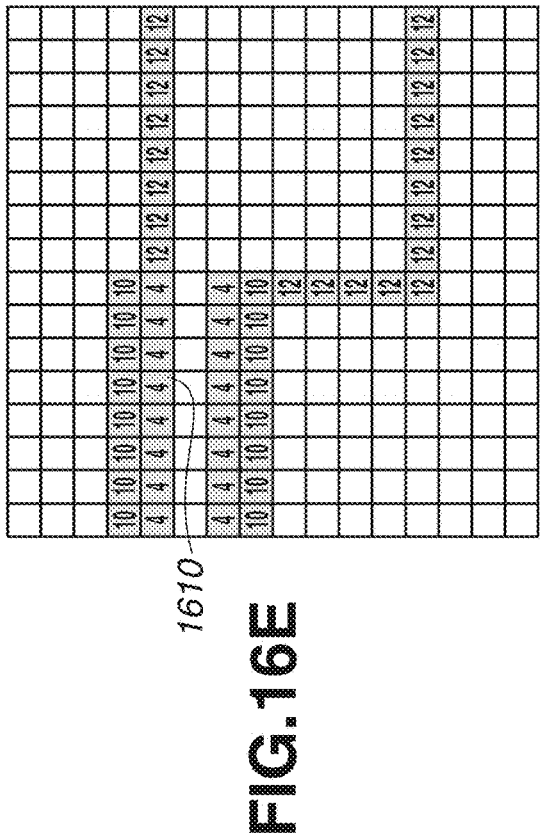

FIG. 16E illustrates a correction image generated by the edge correction unit 306 according to the present exemplary embodiment.

Regarding a pixel 1609, the adjacent pixel 1607 is the thin line edge pixel as illustrated in FIG. 16C, and thus in step S1101, the pixel 1609 is determined as being in the neighborhood of the thin line edge pixel.

A pixel 1610 is on a position one pixel from the pixel 1607, so that in step S1102, it is determined that the distance is one pixel, and the processing in step S1103 is applied.

In step S1103, the correction table in FIG. 14A is referred to. A density of the pixel 1609 is 153, and thus, the correction data of the pixel 1610 is 4.

FIG. 16F illustrates an image of an output result of the edge correction unit 306 according to the present exemplary embodiment.

A pixel 1611 in FIG. 16F is adjacent to the pixel 1607 in FIG. 16C, thus in step S1201, the pixel 1611 is determined as being in the neighborhood of the thin line edge pixel, and the pixel 1610 as the correction data is output. The pixel in the neighborhood of the thin line edge pixel and the edge pixel output the correction image in FIG. 16E, and other pixels output the screen processing result in FIG. 16D.

FIGS. 17A to 17F are drawings used for a comparison with the correction by the edge correction unit 306 according to the present exemplary embodiment.

In FIGS. 17A to 17F, a case is described in which an image including a preliminarily thickened thin line is input to the image processing unit, and the image processing unit determines an edge of the image in which the thin line is preliminarily thickened and corrects the edge pixel. At that time, since the thin line is preliminarily thickened, the thin line edge determination processing by the thin line edge determination unit 303 and the correction processing on the thin line edge pixel by the edge correction unit 306 are not performed. In FIGS. 17A to 17F, comparison is performed with a case in which only the correction processing is performed on the edge pixel.

Figure 17A:
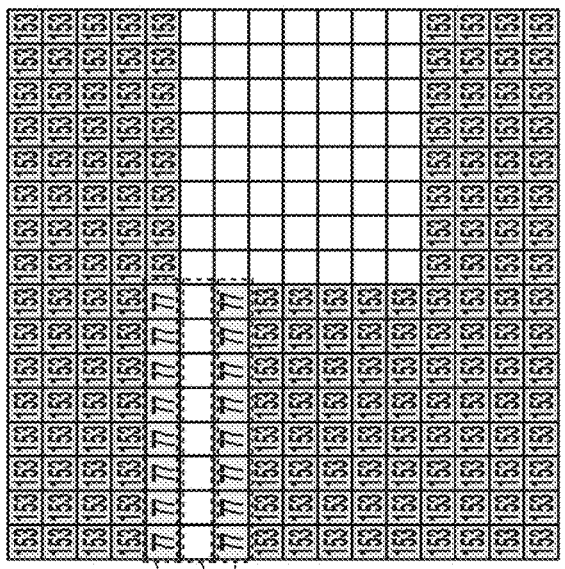
FIGS. 17A to 17F illustrate processing of the edge correction unit according to the first exemplary embodiment.

FIG. 17A illustrates an image in which a thin line is preliminarily thickened. A pixel group 1701 is a one-pixel white thin line, and thus the one-pixel white thin line is thickened by reducing density values of pixel groups 1702 and 1703 from 153 to 77. The density values of the pixel groups 1702 and 1703 are respectively reduced to 50% thereof, and thus the pixel group 1701 is thickened for 0.5 pixel each on both sides.

Figure 17B:
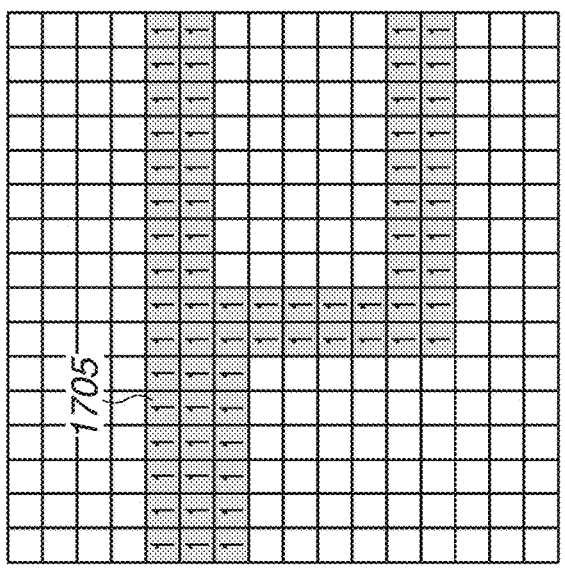
Figure 17C:
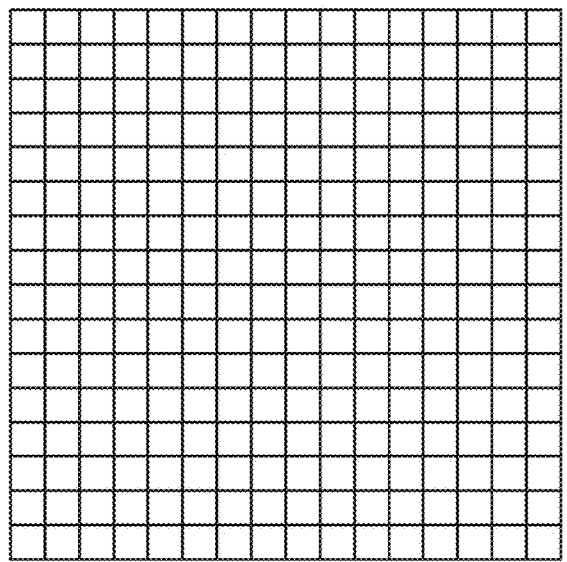
Figure 17D:
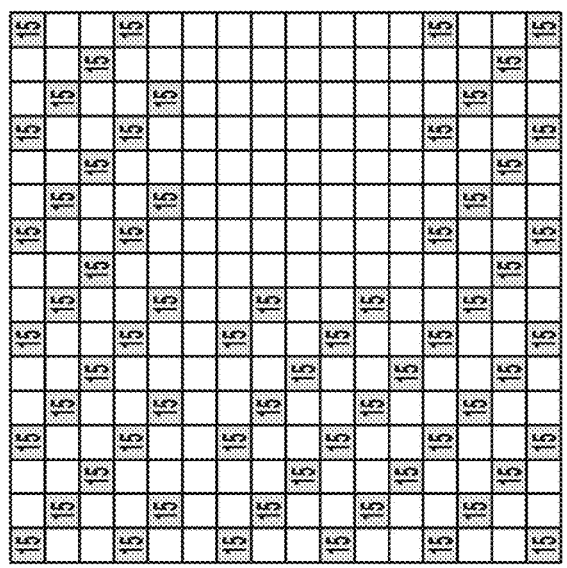

FIG. 17B illustrates an image of an edge determination result used for a comparison with the correction by the edge correction unit 306 according to the present exemplary embodiment. FIG. 17C illustrates an image of a thin line edge determination result used for a comparison with the correction by the edge correction unit 306 according to the present exemplary embodiment. However, in FIGS. 17A to 17F, the thin line is preliminarily thickened, and thus the thin line determination is not performed. FIG. 17D illustrates an image of a screen processing result input from the screen processing unit 305.

Figure 17F:
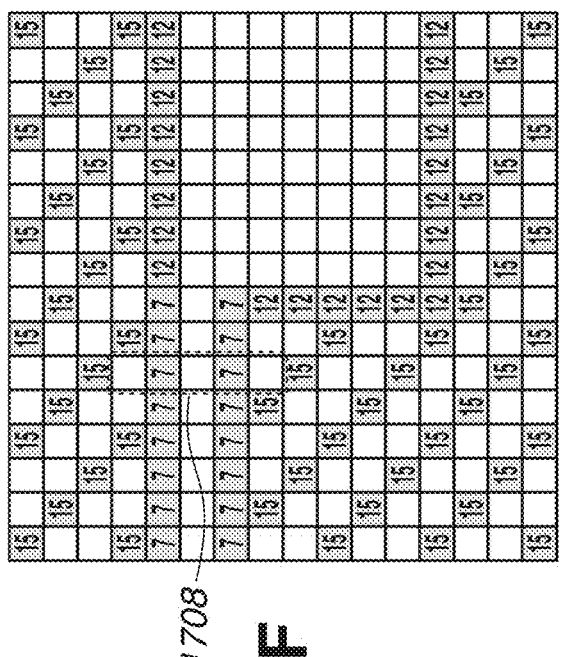
Figure 17E:
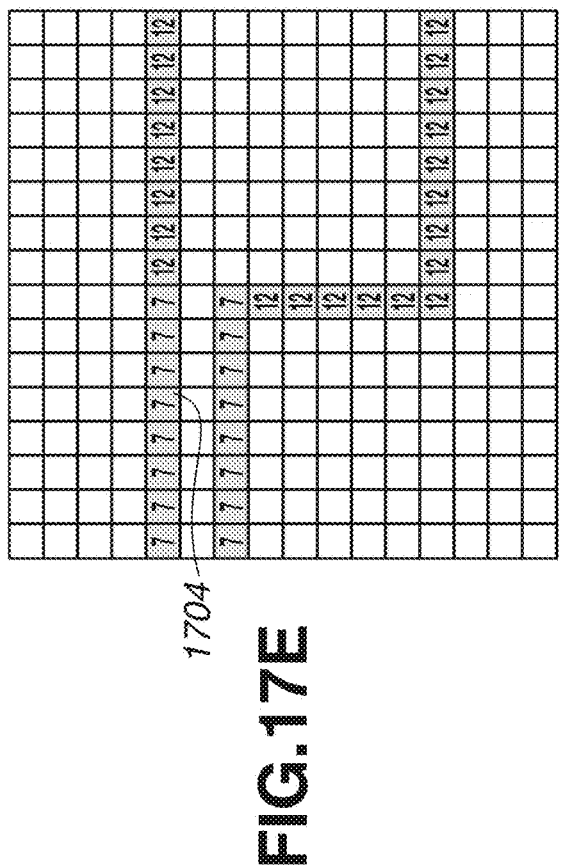

FIG. 17E illustrates a correction image used for a comparison with the correction by the edge correction unit 306 according to the present exemplary embodiment. A pixel 1704 in FIG. 17E represents the edge determination result of a pixel 1705 in FIG. 17B namely the edge pixel, and the correction table in FIG. 15 is referred to. A density of the pixel 1704 is 77, and thus the correction data is 7.

FIG. 17F illustrates an image of an output result used for a comparison with the correction by the edge correction unit 306 according to the present exemplary embodiment.

FIGS. 18A to 18F are drawings used for a comparison with the correction by the edge correction unit 306 according to the present exemplary embodiment.

Figure 18A:
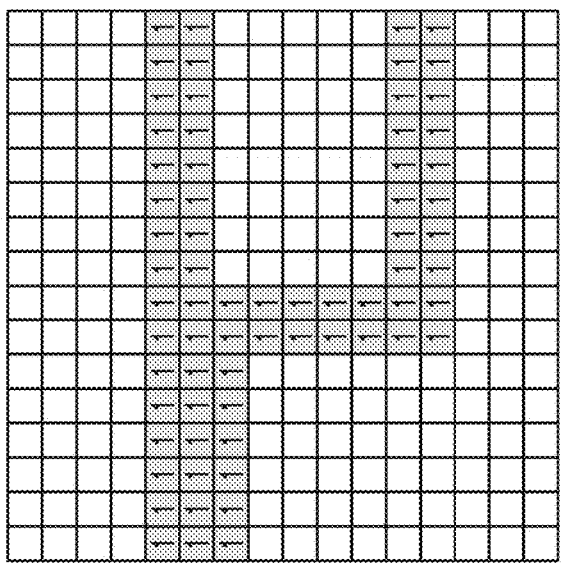
FIGS. 18A to 18F illustrate processing of the edge correction unit according to the first exemplary embodiment.

FIG. 18A illustrates an image which is output from the gamma correction unit 304 according to the present exemplary embodiment and input to the edge correction unit 306.

Figure 18B:
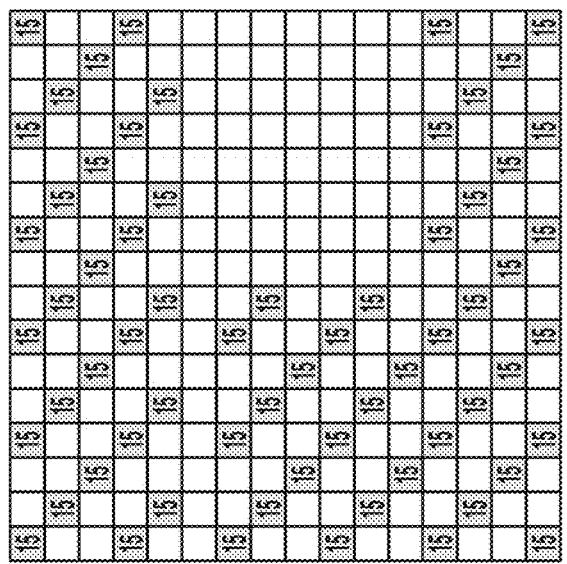

FIG. 18B illustrates an image of an edge determination result when edge pixels are determined according to the edge determination processing in FIG. 5.

Figure 18C:
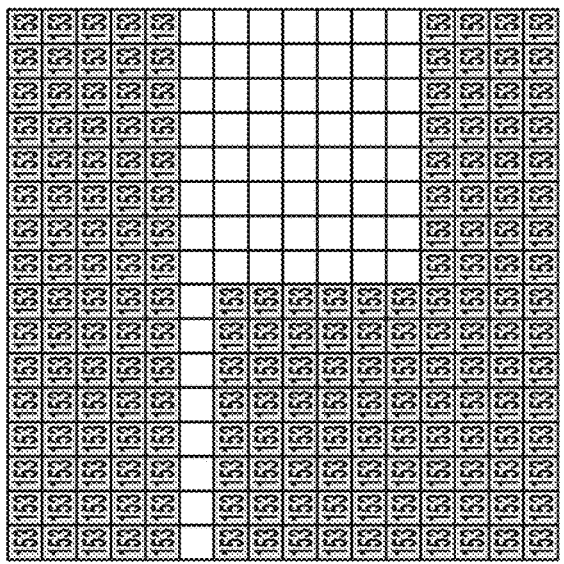

FIG. 18C illustrates an image input from the thin line edge determination unit 303. However, in FIGS. 18A to 18F, the line width of the thin line is not controlled, and thus the thin line edge determination is not performed.

Figure 18D:
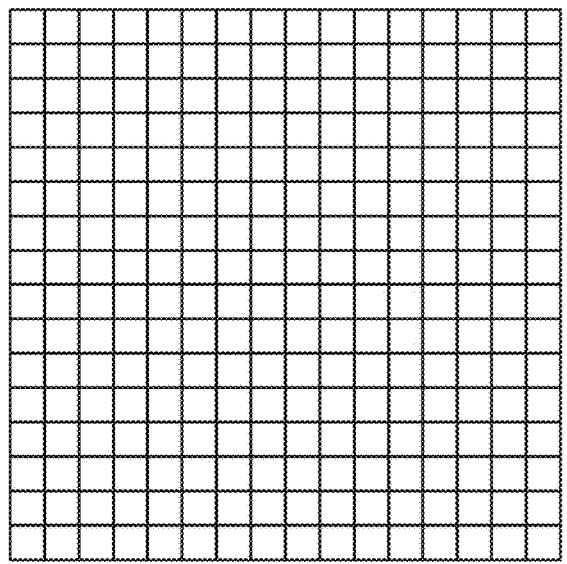

FIG. 18D illustrates an image of a screen processing result input from the screen processing unit 305 according to the present exemplary embodiment.

Figure 18F:
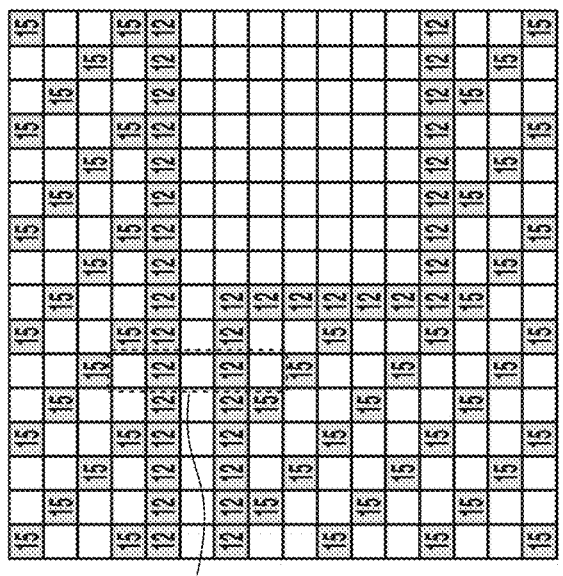
Figure 18E:
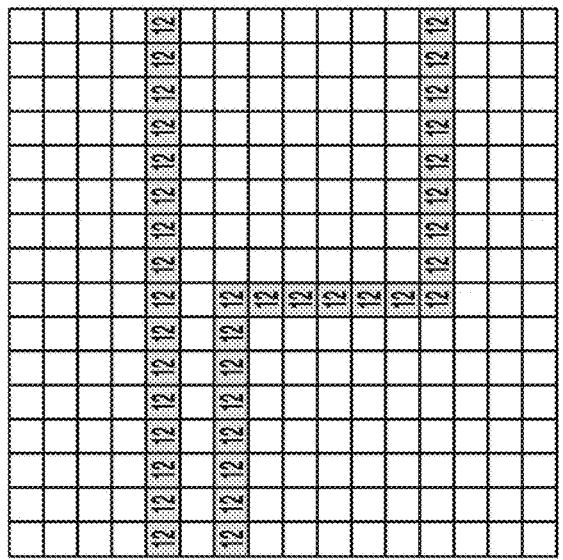

FIG. 18E illustrates a correction image generated by the edge correction unit 306 according to the present exemplary embodiment.

FIG. 18F illustrates an image of an output result of the edge correction unit 306 according to the present exemplary embodiment.

FIG. 19A illustrates a situation of potentials on the photosensitive drum when the exposure control unit 201 exposes the photosensitive drum with light based on image data 1612 of five pixels in FIG. 16F. The center of a pixel 1613 in FIG. 16F is on a position 1903 in FIG. 19A. The center of a pixel 1614 in FIG. 16F is on a position 1904 in FIG. 19A. The center of a pixel 1615 in FIG. 16F is on a position 1905 in FIG. 19A. The center of a pixel 1616 in FIG. 16F is on a position 1906 in FIG. 19A. The center of a pixel 1617 in FIG. 16F is on a position 1907 in FIG. 19A. A potential 1908 is formed by exposure based on the position 1903. A potential 1909 is formed by exposure based on the position 1904. A potential 1910 is formed by exposure based on the position 1906. A potential 1911 is formed by exposure based on the position 1907. In addition, a potential 1912 is obtained by superimposing (combining) the potentials 1908 to 1911.

A potential 1901 is the development bias potential Vdc by the development device, and in the development process, the toner adheres to an area on the photosensitive drum of which the potential is lowered to less than or equal to the development bias potential Vdc, and an electrostatic latent image is developed. In other words, the toner adheres to a portion greater than or equal to the development bias potential (Vdc) in the potential 1912 illustrated in FIG. 19A. Accordingly, the line width of the white thin line is 85 microns.

On the other hand, FIG. 19B illustrates a situation of potentials on the photosensitive drum when the exposure control unit 201 exposes the photosensitive drum with light based on image data 1708 of five pixels in FIG. 17F. A potential 1913 is formed by exposure based on the position 1904. A potential 1913 is formed by exposure based on the position 1906. A potential 1915 is obtained by superimposing (combining) the potentials 1913 and 1914.

In FIG. 19B, the line width of the white thin line in FIG. 17F is 50 microns. As illustrated in FIG. 19B, a portion less than or equal to the development bias potential Vdc is very small in the potential 1915. In other words, it shows that toners to fringe the edge pixel is little, and it is difficult to obtain a sufficient jaggy reduction effect.

FIG. 19C illustrates a situation of potentials on the photosensitive drum when the exposure control unit 201 exposes the photosensitive drum with light based on image data 1801 of five pixels in FIG. 18F. A potential 1916 is formed by exposure based on the position 1904. A potential 1917 is formed by exposure based on the position 1906. A potential 1918 is obtained by superimposing (combining) the potentials 1917 and 1916.

In FIG. 19C, the line width of the white thin line in FIG. 18F is 20 microns.

In the case in which the image including the preliminarily thickened thin line is input to the image processing unit, and the image processing unit determines the edge of the image in which the thin line is preliminarily thickened and corrects the edge pixel as described in FIGS. 17A to 17F, the width of the white thin line can be thickened. Compared with FIG. 19C, it is shown that the width of the white thin line is widened from 20 microns to 50 microns in FIG. 19B. However, the toner fringing the edge pixel is little, and the sufficient jaggy reduction effect cannot be obtained.

According to the method of the present exemplary embodiment, it can be understood that the width of the white thin line is widened from 20 microns to 85 microns in FIG. 19A compared with FIG. 19C. In addition, the potential 1912 in FIG. 19A sufficiently includes the portion greater than or equal to the development bias potential Vdc, and it is shown that the sufficient jaggy reduction effect can be obtained.

Effect

As described above, the thin line edge pixel is detected in addition to the edge pixel, the line width of the thin line is also controlled using the correction data for the jaggy reduction applied to the thin line edge pixel, and accordingly, the line width can be controlled while realizing the jaggy reduction. In addition, improvement in visibility of the thin line can be realized.

According to the present exemplary embodiment, single color is described as the example, however, the same technique can be applied to mixed colors. The thin line correction processing may be performed independently on each color, or the thin line determination may be performed on an image after monochromating. In the case that correction is performed on an outline thin line independently for color, if a color plane determined as the thin line and a color plane other than that are mixed, the processing is not applied to the color plane which is not determined as the thin line, and the color may remain in the thin line portion in some cases. The remains of the color causes a blur, so that in the case that at least one color plane is determined as the thin line in the outline thin line correction, the correction processing is controlled to be applied to all the other color planes.

An image processing according to a second exemplary embodiment of the disclosure is described below.

According to the first exemplary embodiment, the thin line edge pixel is determined, and also the control of the line width of the thin line is performed using the correction data for the jaggy reduction applied to the thin line edge pixel. According to the present exemplary embodiment, a correction amount is determined by further considering a distance from an edge pixel.

According to the first exemplary embodiment, a width of a thin line is controlled by changing correction amounts in the edge pixel and a pixel adjacent to the thin line when adjusting the width of the thin line. However, the correction amounts are different in the edge pixel and the pixel adjacent to the thin line, and a step is generated at a boundary between the edge pixel and the pixel adjacent to the thin line which may be a cause of image deterioration.

According to the second exemplary embodiment, correction of the edge pixel and the pixel adjacent to the thin line are both satisfied, and also a step as a cause of image deterioration is reduced.

In the following description, a difference from the first exemplary embodiment is only described in detail.

Next, the edge correction processing performed by the edge correction unit 306 according to the present exemplary embodiment is described in detail with reference to FIG. 20 to FIGS. 22A to 22D.

Figure 20:
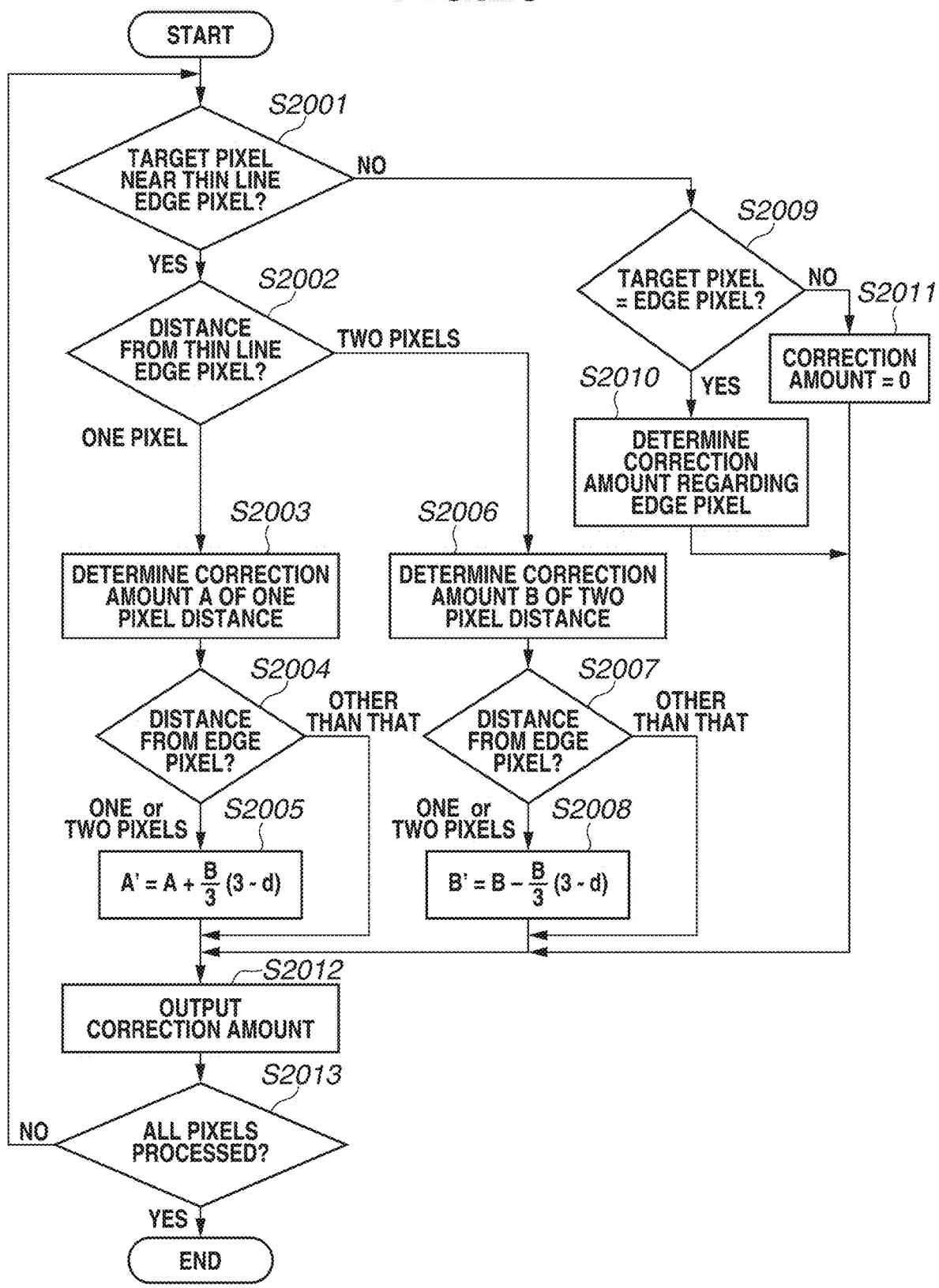
FIG. 20 is a flowchart illustrating processing a correction data generation unit according to a second exemplary embodiment.

FIG. 20 is a flowchart illustrating the edge correction processing performed by the edge correction unit 306 according to the second exemplary embodiment. Each step in the flowchart described below is executed by the correction data generation unit 1001 under an instruction from the CPU 102 illustrated in FIG. 1. FIGS. 21A to 21F illustrate the edge correction processing performed by the edge correction unit 306 according to the second exemplary embodiment. FIGS. 22A to 22D illustrate the edge correction processing performed by the edge correction unit 306 according to the second exemplary embodiment.

In step S2001, the correction data generation unit 1001 determines whether the thin line edge pixel exists in the neighboring two pixels of the target pixel by referring to the determination signal of the thin line edge determination unit 303. When the thin line edge pixel exists in the neighboring two pixels of the target pixel (YES in step S2001), the processing proceeds to step S2002. When the thin line edge pixel does not exist in the neighboring two pixels of the target pixel (NO in step S2001), the processing proceeds to step S2009.

In step S2002, the correction data generation unit 1001 determines a distance of the thin line edge pixel from the target pixel. When the distance of the thin line edge pixel from the target pixel is one pixel, the processing proceeds to step S2003. When the distance of the thin line edge pixel from the target pixel is two pixels, the processing proceeds to step S2006.

In step S2003, the correction data generation unit 1001 determines the correction data by referring to the look-up table for the first pixel from the thin line edge pixel in FIG. 14A and using the pixel value after the gamma correction of the target pixel as an input.

In step S2004, the correction data generation unit 1001 determines whether to adjust a correction amount A according to the distance from the edge pixel. When the distance from the edge pixel is one pixel or two pixels, the processing proceeds to step S2005 to adjust the correction amount A. In the case other than that, the processing proceeds to step S2012 without adjusting the correction amount A.

In step S2005, the correction data generation unit 1001 adjusts the correction amount A according to the distance from the edge pixel. An adjusted correction amount A' is calculated by a following equation. A distance [d] is a distance from a target pixel to an edge pixel which is not a thin line edge pixel.

$$A' = A + \frac{B}{3}(3-d) \quad \text{[Equation 1]}$$

Meaning of the equation is described. In the following description, adjustment of a line width and reduction of a jaggy are realized using the correction data pieces of two pixels of the first pixel and the second pixel from the thin line edge pixel. On the other hand, the jaggy reduction is realized by one pixel in the edge pixel. Accordingly, in the present adjustment, a data amount extending over two pixels is gradually collected together into one pixel. According to the present exemplary embodiment, a case is described as an example in which collection is performed extending over three pixels. The correction amount A is a correction amount of the first pixel from the thin line edge pixel. A correction amount B is a correction amount of the second pixel from the thin line edge pixel. Thus, the correction amount B of the second pixel from the thin line edge pixel is moved to the first pixel by taking three pixels so that the correction data pieces are smoothly connected. Accordingly, a term B/3 in the equation represents an adjustment amount of the correction amount B with respect to the correction amount A per pixel, and 3 is a number derived from three pixels. Accordingly, when adjustment is performed by taking five pixels, an adjustment amount per pixel will be B/5. In addition, a term (3−d) represents the number of adjustment amounts per pixel. The correction amount is moved to the correction amount A by taking three pixels using an adjustment amount of the correction amount B per pixel according to the distance [d].

In step S2006, the correction data generation unit 1001 determines the correction data by referring to the look-up table for the second pixel from the thin line edge pixel in FIG. 14B and using the pixel value after the gamma correction of the target pixel as an input.

In step S2007, the correction data generation unit 1001 determines whether to adjust the correction amount B according to the distance from the edge pixel. When the distance from the edge pixel is one pixel or two pixels, the processing proceeds to step S2008 to adjust the correction amount B. In the case other than that, the processing proceeds to step S2012 without adjusting the correction amount B.

In step S2008, the correction data generation unit 1001 adjusts the correction amount B according to the distance from the edge pixel. An adjusted correction amount B' is calculated by a following equation. The distance [d] is a distance from the target pixel to the edge pixel which is not the thin line edge pixel.

$$B' = B - \frac{B}{3}(3-d) \quad \text{[Equation 2]}$$

As described above, the correction amount B is adjusted by taking three pixels. In the equation of the adjusted correction amount B', one third of an adjustment amount of the correction amount B per pixel is subtracted from the correction amount B. In other words, the adjusted correction amount B' becomes zero at the third pixel, and the correction amount B is completely moved to the correction amount A.

In step S2009, the correction data generation unit 1001 determines whether the target pixel is the edge pixel. When the target pixel is the edge pixel (YES in step S2009), the processing proceeds to step S2010, and when the target pixel is not the edge pixel (NO in step S2009), the processing proceeds to step S2011.

In step S2010, the correction data generation unit 1001 determines the correction amount according to the density of the edge pixel by referring to the look-up table for determining the correction amount of the edge pixel in FIG. 15.

In step S2011, the correction data generation unit 1001 determines that the target pixel is neither the edge pixel nor the neighboring pixel of the thin line edge and sets the correction amount to zero.

In step S2012, the correction data generation unit 1001 outputs the determined correction amount to the data selection unit 1002.

In step S2013, the correction data generation unit 1001 determines whether the processing is performed on all of the pixels, and when it is determined that the processing is not performed on all of the pixels (NO in step S2013), the processing proceeds to step S2001. When the correction data generation unit 1001 determines that the processing is performed on all of the pixels (YES in step S2013), the edge correction processing is terminated.

[Situation of Edge Correction Processing]

The image processing performed by the edge correction unit 306 according to the present exemplary embodiment is described with reference to FIGS. 21A to 21F.

FIGS. 21A to 21F illustrate the processing by the edge correction unit 306 according to the present exemplary embodiment.

Figure 21B:
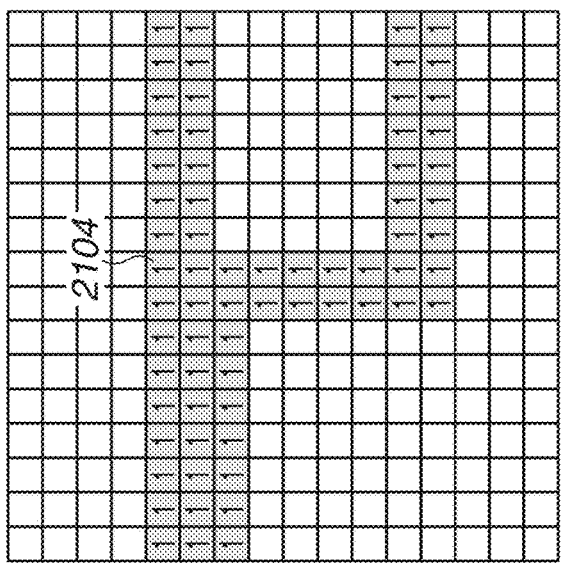
FIGS. 21A to 21F illustrate processing of an edge correction unit according to the second exemplary embodiment.
Figure 21D:
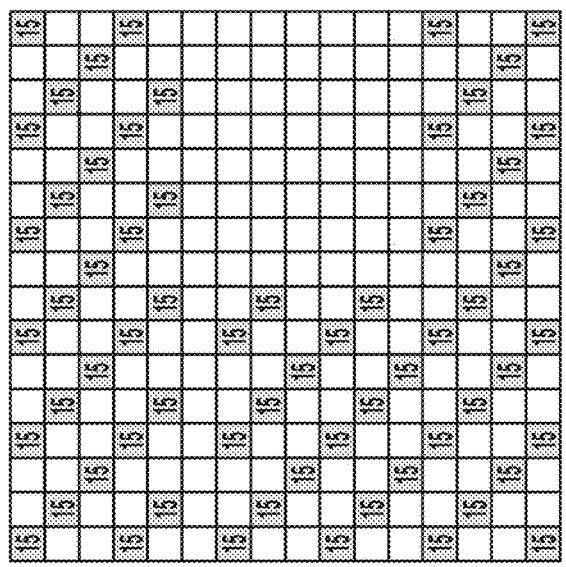
Figure 21A:
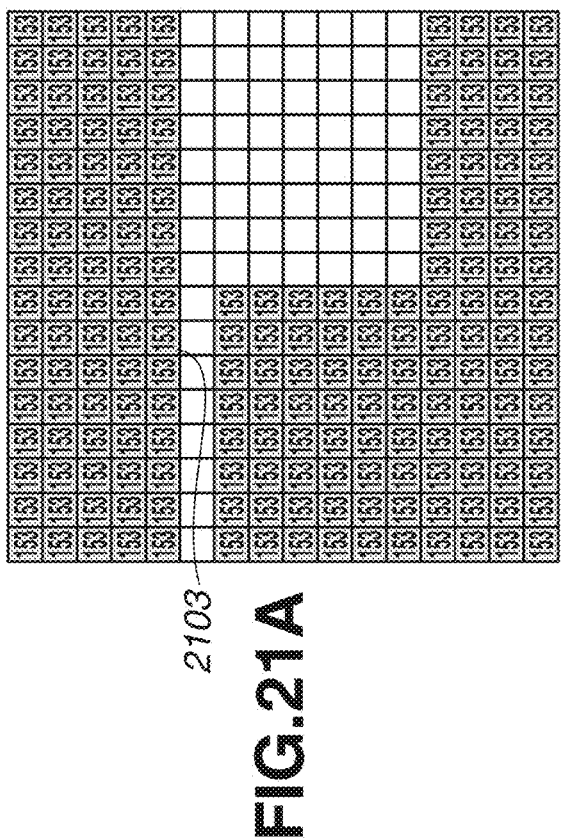
Figure 21C:
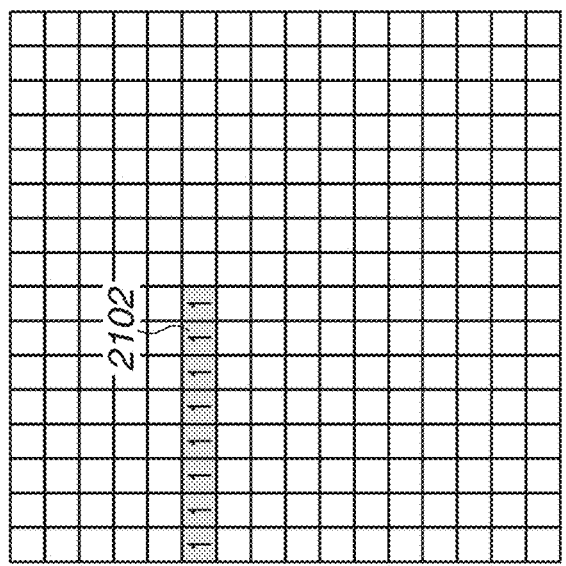
Figure 21E:
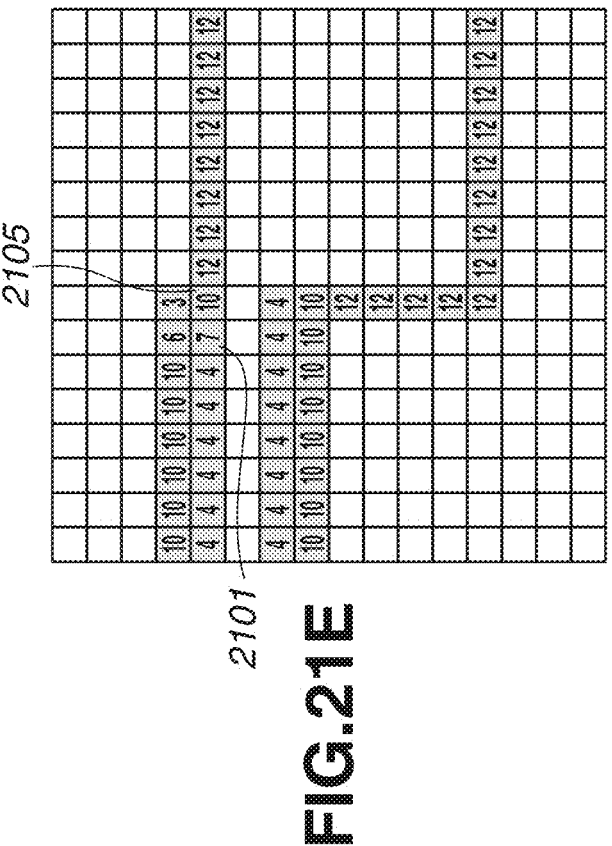
Figure 21F:
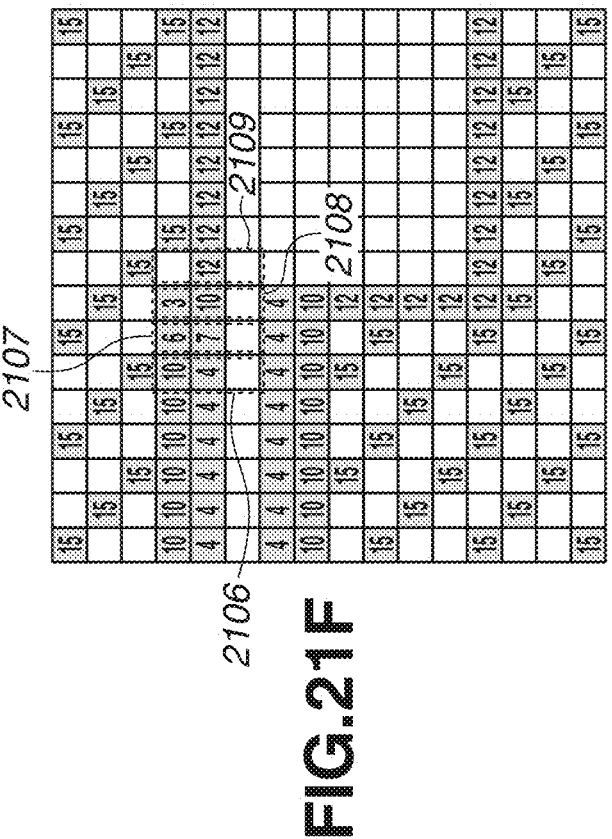

FIG. 21A illustrates an image which is output from the gamma correction unit 304 according to the present exemplary embodiment and input to the edge correction unit 306. FIG. 21B illustrates an image of an edge determination result which is input from the edge determination unit 302 according to the present exemplary embodiment. FIG. 21C illustrates an image of a thin line edge determination result which is input from the thin line edge determination unit 303 according to the present exemplary embodiment. FIG. 21D illustrates an image of a screen processing result input from the screen processing unit 305 according to the present exemplary embodiment. FIG. 21E illustrates a correction image generated by the edge correction unit 306 according to the present exemplary embodiment. FIG. 21F illustrates an image of an output result of the edge correction unit 306 according to the present exemplary embodiment.

The edge correction processing is described which is performed when the target pixel is a pixel 2101 in FIG. 21E. As illustrated in FIG. 21C, the target pixel 2101 is adjacent to a pixel 2102 of the thin line edge pixel, and thus, the processing proceeds to step S2002 according to the determination result in step S2001.

Further, the pixel 2101 is one pixel distance from the pixel 2102, and the processing proceeds to step S2003. A pixel value of a pixel 2103 is 153, so that the correction amount A is obtained as 4 by referring to the look-up table in FIG. 14A.

An edge pixel 2104 is two pixels away from the pixel 2101, the processing proceeds to step S2005, and the correction amount A is adjusted.

Next, in step S2005, the correction amount A is corrected according to a distance from the edge pixel which is not the thin line edge pixel to the target pixel. Regarding the target pixel 2101, the distance from the edge pixel which is not the thin line edge pixel is two, thus the distance d is two. Accordingly, the correction amount A' of the pixel 2101 is calculated as follows.

$$A' = A + (B/3) * (3 - d) =$$
$$4 + (10/3) * (3 - 2) = 7.33 = 7 \text{ (rounding down decimal places)}$$

Similarly, regarding the pixel 2105, the distance from the edge pixel which is not the thin line edge pixel is one, and the distance d is one. Accordingly, the correction amount A' of a pixel 2105 is calculated as follows.

$$A' = A + (B/3) * (3 - d) =$$
$$4 + (10/3) * (3 - 1) = 10.66 = 10 \text{ (rounding down decimal places)}$$

Figure 22A:
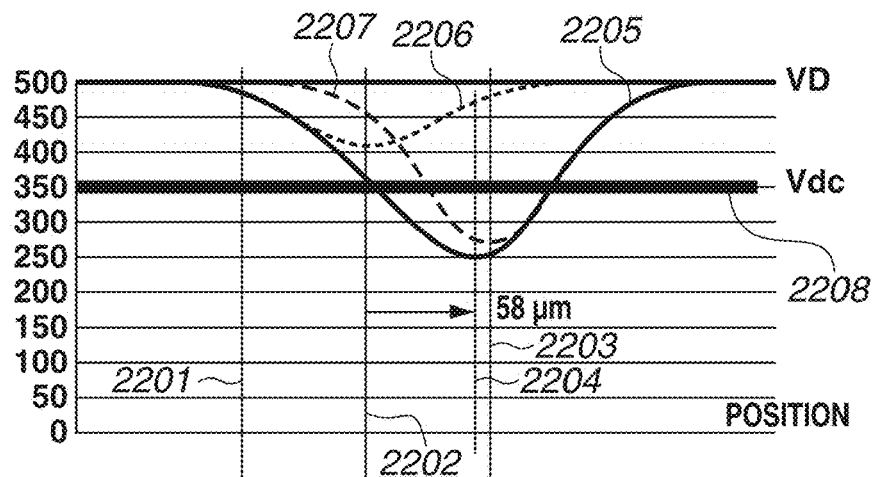
FIGS. 22A to 22D illustrate potentials of a photosensitive member according to the second exemplary embodiment.

FIG. 22A illustrates a situation of potentials on the photosensitive drum when the exposure control unit 201 exposes the photosensitive drum with light based on image data 2106 of three pixels in FIG. 21F. Positions 2201, 2202, and 2203 are center positions of the respective three pixels in the image data 2106. A potential 2208 is the development bias potential Vdc by the development device, and in the development process, the toner adheres to an area on the photosensitive drum of which a potential is lowered to less than or equal to the development bias potential Vdc, and an electrostatic latent image is developed. A potential 2206 is formed by exposure based on the position 2202. A potential 2207 is formed by exposure based on the position 2203. A potential 2205 which is formed by exposure based on the image data of the two pixels at the positions 2202 and 2203 is obtained by superimposing (combining) the potentials 2206 and 2207. A position 2204 is a center position of the potential 2205.

Figure 22B:
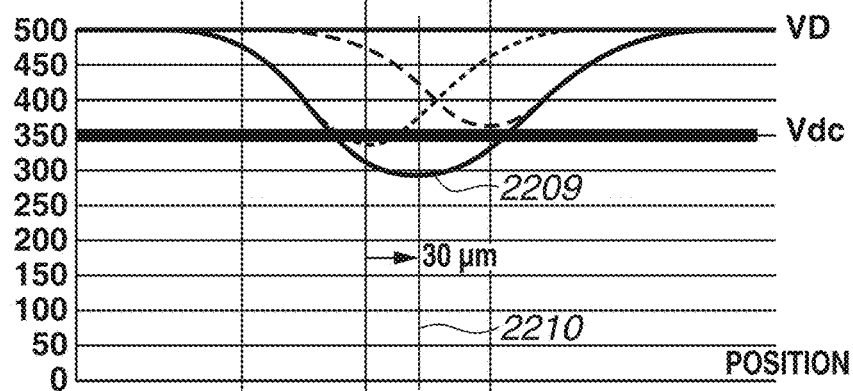

FIG. 22B illustrates a situation of potentials on the photosensitive drum when the exposure control unit 201 exposes the photosensitive drum with light based on image data 2107 of three pixels in FIG. 21F. A potential 2209 is formed by exposure based on the image data 2107 of three pixels. A position 2210 is a center position of the potential 2209.

Figure 22C:
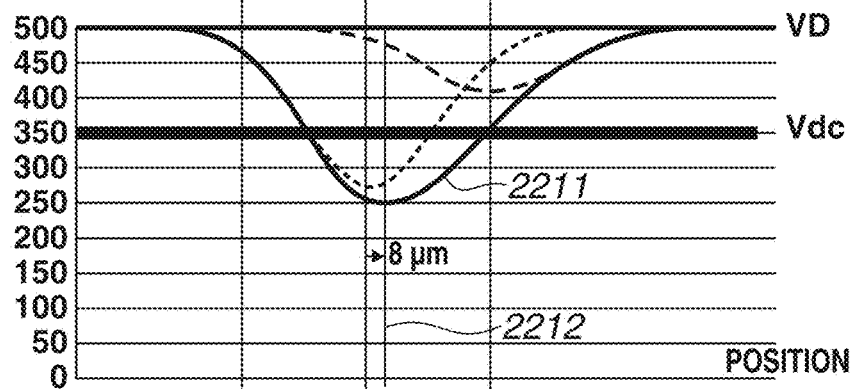

FIG. 22C illustrates a situation of potentials on the photosensitive drum when the exposure control unit 201 exposes the photosensitive drum with light based on image data 2108 of three pixels in FIG. 21F. A potential 2211 is formed by exposure based on the image data 2108 of three pixels. A position 2212 is a center position of the potential 2211.

Figure 22D:
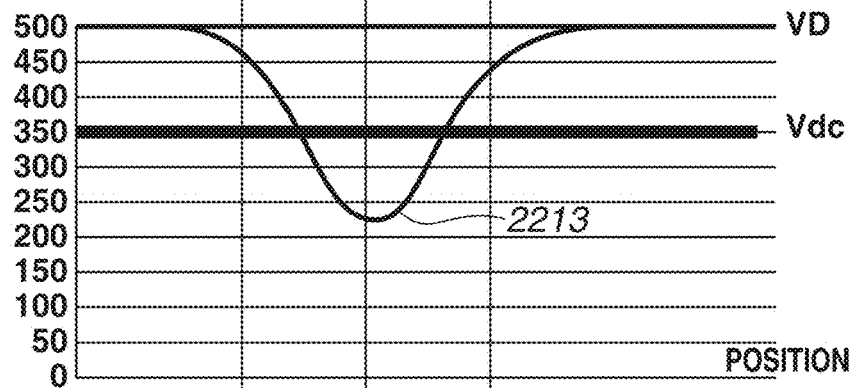

FIG. 22D illustrates a situation of potentials on the photosensitive drum when the exposure control unit 201 exposes the photosensitive drum with light based on image data 2109 of three pixels in FIG. 21F. A potential 2213 is formed by exposure based on the image data 2109 of three pixels.

The center of the potential 2205 illustrated in FIG. 22A is on the position 2204. The center of the potential 2209 illustrated in FIG. 22B is on the position 2210. The center of the potential 2211 illustrated in FIG. 22C is on the position 2212. The center of the potential 2213 illustrated in FIG. 22D is on the position 2202. As can be understood from the above description, the center of correction can be moved from the position 2204 to the position 2202 in stages. According to the second exemplary embodiment, as shown in FIG. 22A to FIG. 22D, the positions of the peaks of the potentials are changed smoothly.

As described above, the correction amount is determined in consideration of the distance from the edge pixel which is not the thin line edge pixel, so that a step at the boundary between the edge pixel and the pixel adjacent to the thin line can be suppressed.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-027297, filed Feb. 16, 2017, which is hereby incorporated by reference herein in its entirety.

What is claimed is:

1. An apparatus including an image forming unit comprising:
one or more memories; and
one or more circuitries which use the one or more memories and function as:
an identifying unit configured to identify a target pixel which has density value less than a threshold value and is sandwiched in a predetermined direction between two reference pixels having density values greater than or equal to the threshold value in image data;
a screening processing unit configured to generate screen image data by performing screening processing on the image data; and
an output unit configured to receive the screen image data and output a density value of the screen image data for a pixel, to the image forming unit,
wherein the output unit outputs, for each of (i) one of the two reference pixels sandwiching the identified target pixel and (ii) a pixel adjacent to the one reference pixel in the predetermined direction and different from the identified target pixel, an adjusted density value of the screen image data,
wherein the one or more circuitries further perform as another identifying unit configured to identify an edge of an object included in the image data, and
wherein the one or more circuitries adjust a density value of a pixel of the identified edge to a density value greater than the density values of the one reference pixel and the adjacent pixel which are adjusted based on the identified edge.

2. An apparatus including an image forming unit configured to form an electrostatic latent image by exposing a charged photosensitive member with light, the apparatus comprising:
one or more memories; and
one or more circuitries which use the one or more memories and function as:
an identifying unit configured to identify a target pixel which has density value less than a threshold value and is sandwiched in a predetermined direction between two reference pixels having density values greater than or equal to the threshold value in image data;
a screening processing unit configured to generate screen image data by performing screening processing on the image data; and
an adjustment unit configured to adjust a density value of each of (i) one reference pixel in the two reference pixels sandwiching the identified target pixel and (ii) a pixel which is adjacent to the one reference pixel in the predetermined direction to a positive value in the screen image data,
wherein the image forming unit exposes the one reference pixel and the adjacent pixel with light based on the adjusted density values of the screen image data,
wherein the one or more circuitries further perform as another identifying unit configured to identify an edge of an object included in the image data, and
wherein the adjustment unit adjusts a density value of a pixel of the identified edge to a density value greater than the density values of the one reference pixel and the adjacent pixel which are adjusted to the positive value based on the identified edge.

3. The apparatus according to claim 2, wherein the identified target pixel is different from the adjacent pixel.

4. The apparatus according to claim 2, wherein, in the screen image data, another reference pixel in the two reference pixels, the identified target pixel, the one reference pixel, and the adjacent pixel are aligned in this order in the predetermined direction.

5. The apparatus according to claim 2, wherein, in the screen image data, the density value of each of the one reference pixel and the adjacent pixel is zero.

6. The apparatus according to claim 2, wherein the adjustment unit adjusts the density value of each of the one reference pixel and the adjacent pixel, so that a peak of a potential formed on the photosensitive member by the exposure of the one reference pixel and the adjacent pixel by the image forming unit comes to a position between the one reference pixel and the adjacent pixel and a magnitude of the potential becomes greater than a predetermined potential.

7. The apparatus according to claim 2, wherein the adjustment unit determines density values of the one reference pixel and the adjacent pixel in the screen image data based on a density value of each of the one reference pixel and the adjacent pixel in image data before screening processing.

8. The apparatus according to claim 2, wherein the one reference pixel and the adjacent pixel in the screen image data is white pixels.

9. The apparatus according to claim 2, wherein the adjustment unit performs the adjustment by selecting and outputting either of a density value of a pixel in the screen image data and the adjusted density value for each pixel based on the identifying by the identifying unit and the another identifying unit.

10. A method for controlling an apparatus including an image forming unit, the method comprising:
identifying a target pixel which has density value less than a threshold value and is sandwiched in a predetermined direction between two reference pixels having density values greater than or equal to the threshold value in image data;
generating screen image data by screening processing on the image data;
receiving the screen image data and outputting a density value of the screen image data for a pixel to the image forming unit;
outputting, for each of (i) one pixel of the two reference pixels sandwiching the identified target pixel and (ii) a pixel which is adjacent to the one reference pixel in the predetermined direction and different from the identified target pixel, an adjusted density value instead of a density value of the screen image data, to the image forming unit;

identifying an edge of an object included in the image data; and adjusting a density value of a pixel of the identified edge to a density value greater than the density values of the one reference pixel and the adjacent pixel which are adjusted based on the identified edge.

11. The method according to claim 10, further comprising:

acquiring the adjusted density value from a data table for each of (i) the one pixel of the two reference pixels sandwiching the identified target pixel and (ii) the pixel which is adjacent to the one reference pixel in the predetermined direction and different from the identified target pixel, wherein the acquired adjusted density value is output, for each of (i) the one pixel of the two reference pixels sandwiching the identified target pixel and (ii) the pixel which is adjacent to the one reference pixel in the predetermined direction and different from the identified target pixel.

12. The method according to claim 10, wherein the adjusted density values output for (i) the one reference pixel of the two reference pixels sandwiching the identified pixel and (ii) the pixel which is adjacent to the one reference pixel in the predetermined direction and different from the identified target pixel is positive values, and the positive values are determined, respectively, based on density values in the image data of (i) the one reference pixel of the two reference pixels sandwiching the identified target pixel and (ii) the pixel which is adjacent to the one reference pixel in the predetermined direction and different from the identified target pixel.

13. The method according to claim 10, further comprising adjusting a density value of each of (i) one reference pixel in the two reference pixels sandwiching the identified target pixel and (ii) a pixel which is adjacent to the one reference pixel in the predetermined direction to a positive value in the screen image data.

14. The method according to claim 13, wherein the image forming unit exposes the one reference pixel and the adjacent pixel with light based on the adjusted density values of the screen image data.

15. The method according to claim 10, wherein the identified target pixel is different from the adjacent pixel.

16. The method according to claim 10, wherein, in the screen image data, another reference pixel in the two reference pixels, the identified target pixel, the one reference pixel, and the adjacent pixel are aligned in this order in the predetermined direction.

17. The method according to claim 10, wherein, in the screen image data, the density value of each of the one reference pixel and the adjacent pixel is zero.

18. The method according to claim 10, further comprising identifying an edge of an object included in the image data.

19. The method according to claim 10, wherein the one reference pixel and the adjacent pixel in the screen image data is white pixels.

* * * * *